US011295609B1

(12) United States Patent
Tanaka et al.

(10) Patent No.: US 11,295,609 B1
(45) Date of Patent: Apr. 5, 2022

(54) TRAVEL ASSISTANCE METHOD AND TRAVEL ASSISTANCE DEVICE

(71) Applicant: Nissan Motor Co., Ltd., Yokohama (JP)

(72) Inventors: Shinya Tanaka, Kanagawa (JP); Shoichi Takei, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 17/299,209

(22) PCT Filed: Dec. 6, 2018

(86) PCT No.: PCT/IB2018/001484
§ 371 (c)(1),
(2) Date: Jun. 2, 2021

(87) PCT Pub. No.: WO2020/115516
PCT Pub. Date: Jun. 11, 2020

(51) Int. Cl.
*G08G 1/01* (2006.01)
*G08G 1/052* (2006.01)
*G08G 1/16* (2006.01)

(52) U.S. Cl.
CPC .......... *G08G 1/0129* (2013.01); *G08G 1/052* (2013.01); *G08G 1/166* (2013.01)

(58) Field of Classification Search
CPC ....... G08G 1/0129; G08G 1/166; G08G 1/052
See application file for complete search history.

(56) References Cited

U.S. PATENT DOCUMENTS

| 10,293,819 | B1* | 5/2019 | El-Khatib | B60W 50/14 |
| 10,875,528 | B2 | 12/2020 | Shalev-Shwartz et al. | |
| 11,034,346 | B2 | 6/2021 | Shalev-Shwartz et al. | |
| 11,173,900 | B2 | 11/2021 | Shalev-Shwartz et al. | |
| 2005/0015203 | A1* | 1/2005 | Nishira | G08G 1/167 701/301 |
| 2015/0100216 | A1* | 4/2015 | Rayes | B60W 30/143 701/96 |
| 2019/0272750 | A1 | 9/2019 | Fukumoto et al. | |
| 2019/0308627 | A1 | 10/2019 | Fukuda et al. | |
| 2019/0329768 | A1 | 10/2019 | Shalev-Shwartz et al. | |
| 2019/0329769 | A1 | 10/2019 | Shalev-Shwartz et al. | |
| 2019/0329773 | A1 | 10/2019 | Shalev-Shwartz et al. | |
| 2019/0329778 | A1* | 10/2019 | D'Sa | B62D 15/0255 |
| 2019/0329779 | A1* | 10/2019 | D'Sa | B60W 30/18163 |
| 2019/0329782 | A1 | 10/2019 | Shalev-Shwartz et al. | |

(Continued)

FOREIGN PATENT DOCUMENTS

JP 2007-179388 A 7/2007
JP 2010-182207 A 8/2010
(Continued)

*Primary Examiner* — Behrang Badii
(74) *Attorney, Agent, or Firm* — Young Basile Hanlon & MacFarlane, P.C.

(57) ABSTRACT

A travel assistance method selects a merging destination vehicle that will travel in front or behind a host vehicle when the host vehicle merges into an adjacent lane, based on a history of whether other vehicles traveling in the adjacent lane allowed merging of a first preceding vehicle traveling in front of the host vehicle on a host lane and locations of the other vehicles traveling in the adjacent lane in a lane direction within a section in which the merging into the adjacent lane from the host lane is possible.

33 Claims, 9 Drawing Sheets

(56) References Cited

U.S. PATENT DOCUMENTS

2019/0329783 A1* 10/2019 Shalev-Shwartz .......................... G06K 9/00825
2019/0333381 A1   10/2019 Shalev-Shwartz et al.
2021/0269021 A1    9/2021 Shalev-Shwartz et al.

FOREIGN PATENT DOCUMENTS

| JP | 2015-66962  A  | 4/2015  |
| JP | 2016-004425 A  | 1/2016  |
| JP | 2016-7954   A  | 1/2016  |
| JP | 2016-134115 A  | 7/2016  |
| JP | 2018-18389  A  | 2/2018  |
| JP | 2018-169895 A  | 11/2018 |
| WO | 2017/171040 A1 | 10/2017 |
| WO | 2018/132614 A2 | 7/2018  |

* cited by examiner

TRAVEL ASSISTANCE METHOD AND TRAVEL ASSISTANCE DEVICE

TECHNICAL FIELD

The present invention relates to a travel assistance method and a travel assistance device.

BACKGROUND

Conventionally, there have been known lane change assistance devices that assist a lane change by cut-in (see Japanese Patent Application Publication No. 2016-004425). In Japanese Patent Application Publication No. 2016-004425, based on a difference in speed between a preceding vehicle and a following vehicle in a lane into which a host vehicle is attempting to cut and an inter-vehicle distance between the preceding vehicle and the following vehicle, whether the following vehicle allows the cut-in by the host vehicle is determined.

SUMMARY

However, in a traffic congestion, often, the difference in speed between the preceding vehicle and the following vehicle is small, and the inter-vehicle distance between the preceding vehicle and the following vehicle is short as well. For this reason, there has been a problem that it is impossible to make the proper assistance for the cut-in by the host vehicle since it is difficult to determine whether the cut-in by the host vehicle is allowed based on the difference in speed and the inter-vehicle distance.

The present invention is made in view of the above-described problem, and an object thereof is to provide a travel assistance method and a travel assistance device, for a case where a host lane in which a host vehicle is traveling merges into an adjacent lane, that assist proper merging of the host vehicle into the adjacent lane.

One aspect of the present invention is a travel assistance method, for a case where a host lane in which a host vehicle is traveling merges into an adjacent lane, that assists the merging of the host vehicle into the adjacent lane. The travel assistance method selects a merging destination vehicle that will travel in front or behind a host vehicle when the host vehicle merges into an adjacent lane, based on a history of whether other vehicles traveling in the adjacent lane allowed merging of a first preceding vehicle traveling in front of the host vehicle on a host lane and locations of the other vehicles traveling in the adjacent lane in a lane direction within a section in which the merging into the adjacent lane from the host lane is possible.

According to an aspect of the present invention, in a case where a host lane in which a host vehicle is traveling merges into an adjacent lane, it is possible to assist proper merging of the host vehicle into the adjacent lane.

DETAILED DESCRIPTION

Embodiments are described with reference to the drawings. In the contents of the drawings, the same parts are given with the same reference signs to omit the descriptions.

Figure 2:
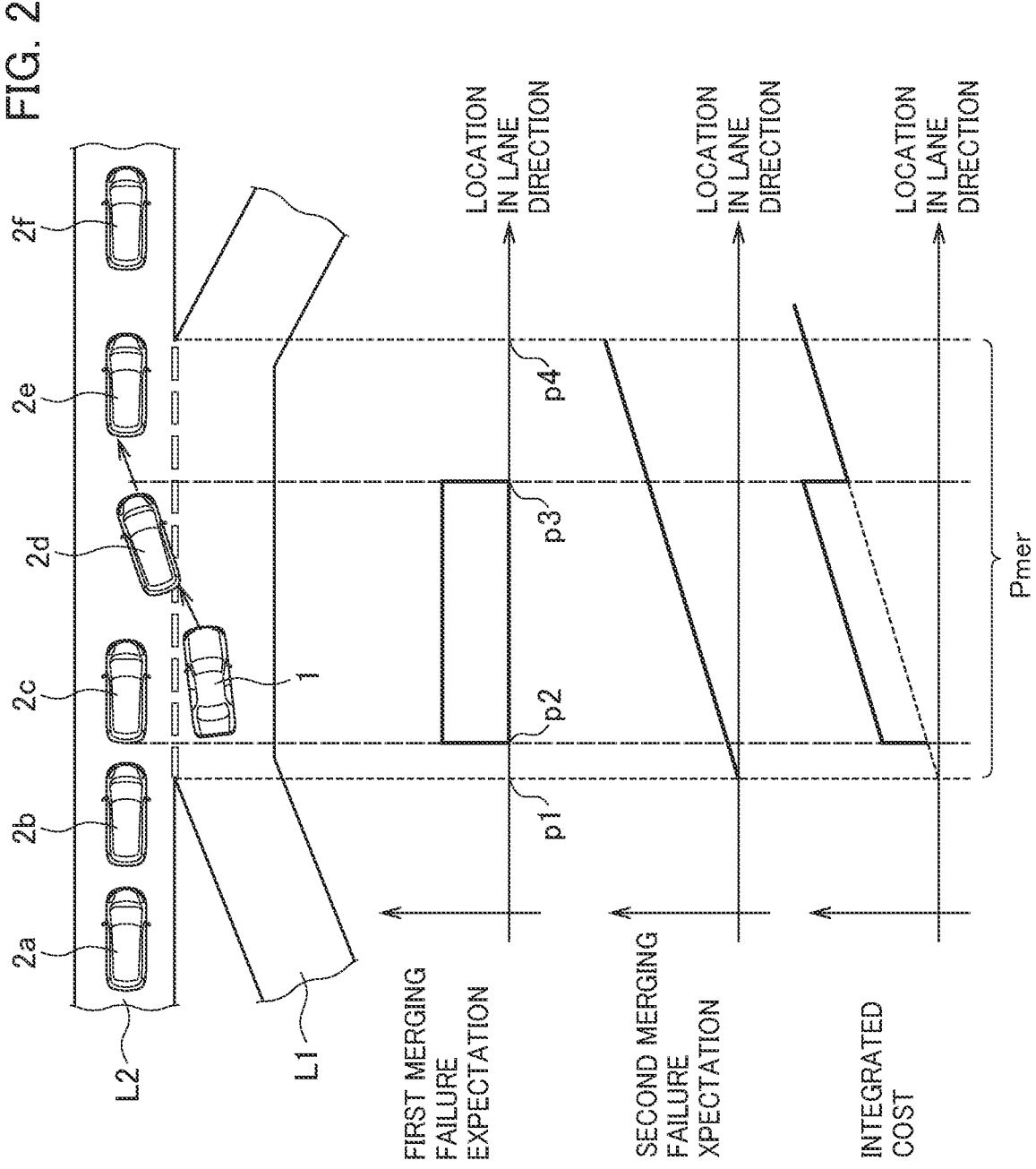
FIG. 2 is a diagram illustrating an example of a road structure where a host lane L1 merges into an adjacent lane L2 and then the host lane L1 diverges from the adjacent lane L2 after passing through a predetermined mergeable section Pmer, and an example of distributions of first merging failure expectations and second merging failure expectations for the road structure.

A travel assistance device according to the embodiments functions effectively in a traveling scene as illustrated in FIG. 2, for example. In FIG. 2, a host vehicle 1 is traveling in a host lane L1. The host lane L1 merges into another lane L2, and then the host lane L1 diverges back from the other lane L2 after passing through a predetermined mergeable section Pmer. Vehicles traveling in the host lane L1 or the lane L2 can change lanes in both directions within the mergeable section Pmer. Hereinafter, the other lane L2 is referred to as an "adjacent lane L2".

In this case, "merging of the lanes (L1, L2)" indicates a state where the two lanes (L1, L2) originally separated from each other are to be adjacent to each other, and also a vehicle traveling in one lane of the two lanes (L1, L2) is to be capable of changing lane to the other lane. The mergeable section Pmer terminates at a predetermined point (termination point). That is, it is impossible to change lane after the termination point. Note that, it does not matter whether either one of the two lanes (L1, L2) disappears or diverges back as illustrated in FIG. 2 after the termination point. Any case is acceptable as long as it is possible to define the termination point of the mergeable section Pmer extending in the lane direction. This means, even in a case other than that of FIG. 2 that is, for example, a traveling scene where a part of multiple lanes in a one-way road, which allow a lane change in the multiple directions, is closed due to a stopped vehicle, a construction, or the like, it is still possible to define the location of the stopped vehicle or the construction as the termination point of the mergeable section Pmer. Thus, even in this traveling scene, the travel assistance device according to the embodiments functions effectively as with FIG. 2.

The host vehicle 1 attempts to change lane (hereinafter, referred to as "merge") from the host lane L1 to the adjacent lane L2. Around the mergeable section Pmer, there are an other vehicle 2d merging into the adjacent lane L2 from the host lane L1 like the host vehicle 1 does and other vehicles 2a, 2b, 2c, 2e, and 2f traveling in the adjacent lane L2. The other vehicles 2a, 2b, 2c, 2e, and 2f traveling in the adjacent lane L2 include not only other vehicles traveling in the adjacent lane L2 before the mergeable section Pmer but also other vehicles that had been traveling in the host lane L1 before the mergeable section Pmer but merged into the adjacent lane L2 in the mergeable section Pmer.

The other vehicles (2a to 2f) traveling in the adjacent lane L2 form a line of vehicles. In other words, the multiple other vehicles (2a to 2f) traveling in the adjacent lane L2 are traveling at similar speeds while having similar inter-vehicle distances. An example thereof is illustrated in FIG. 2 as the traveling scene where the adjacent lane L2 is congested. With this, the multiple other vehicles (2a to 2f) are traveling at a low speed (30 km or less) while having a narrow inter-vehicle distance (1.0 m to 3.0 m) in the adjacent lane L2.

In the traveling scene as described above, the host vehicle 1 is planning to merge from the host lane L1 into the adjacent lane L2 in the mergeable section Pmer. The host vehicle 1 determines which vehicle of the multiple other vehicles (2a to 2f) traveling in the adjacent lane L2 is appropriate for the host vehicle 1 to merge in front thereof. That is, the host vehicle 1 determines which one of the other vehicles (2a to 2f) will give way to the host vehicle 1.

However, when the other vehicles (2a to 2f) form the line of vehicles, the other vehicles have no or small difference in their speeds and inter-vehicle distances, and thus it is difficult to select one out of the other vehicles (2a to 2f).

The travel assistance device according to the embodiments uses at least a history (merging history) about merging of the other vehicles (2a to 2f) traveling in the host lane L1 or the adjacent lane L2 to identify the other vehicle (any of 2a to 2f) that will give way out of the other vehicles (2a to 2f). Specifically, based on the merging history, the travel assistance device calculates, for each of the other vehicles (2a to 2f), an expectation that the host vehicle 1 will fail in merging into the adjacent lane L2 (a merging failure expectation). Then, based on the merging failure expectations, the other vehicle (any of 2a to 2f) that will give way is identified out of the other vehicles (2a to 2f). The "merging history" is a history of actions that each of the other vehicles (2a to 2f) traveling in the host lane L1 or the adjacent lane L2 had in the mergeable section Pmer. The "merging failure expectation" indicates the probability that the host vehicle 1 cannot merge when trying to merge between the other vehicles (2a to 2f) and another vehicle (preceding vehicle) traveling in front of the other vehicles (2a to 2f). In other words, the "merging failure expectation" is an expectation that the other vehicles (2a to 2f) reject a merging request from the host vehicle 1. Needless to say, the expectation or the probability of a "merging success" may be used instead of that of the "merging failure". For example, the other vehicle (any of 2a to 2f) that will give way may be identified by using a "merging success expectation" instead of the "merging failure expectation".

According to the embodiments, it is possible to make a proper determination on the merging of the host vehicle 1 into the adjacent lane L2 by taking into consideration not only current behaviors of the other vehicles (2a to 2f) but also the past actions of the other vehicles (2a to 2f). Hereinafter, a travel assistance method and a travel assistance device according to a first embodiment and a second embodiment are described in detail. Note that, the traveling scene as illustrated in FIG. 2 is an example of a traveling scene where the travel assistance method and the travel assistance device according to the first embodiment and the second embodiment function effectively, and the scope of applying the travel assistance method and the travel assistance device according to the first embodiment and the second embodiment is not limited by the traveling scene.

First Embodiment

An overall configuration of a vehicle control device including the travel assistance device according to the first embodiment is described with reference to FIG. 1. The travel assistance device according to the first embodiment, for a case where the host lane L1 in which the host vehicle 1 is traveling merges into the adjacent lane L2 adjacent to the host lane L1 in front of the host vehicle 1, assists the merging of the host vehicle 1 into the adjacent lane L2. The vehicle control device according to the first embodiment includes a host vehicle location obtainment unit 10, an object detection unit 20, and a controller 30.

The object detection unit 20 includes various kinds of multiple object detection sensors mounted in the host vehicle to detect objects around the host vehicle, such as a laser radar, a milli-meter wave radar, a camera, and a lidar (LiDAR: Light Detection and Ranging). The object detection unit 20 detects objects around the host vehicle 1 by using the multiple object detection sensors. The object detection unit 20 detects moving objects including the other vehicles (2a to 2f) including a two-wheeled vehicle, and static objects on a roadway or around a roadway such as a road marking, a road sign, a curb stone, a guard rail, a wall, and a parked vehicle. For example, the locations, the attitudes, the sizes, the speeds, the accelerations, the decelerations, and the yaw rates of the moving objects or the static objects (referred to as "objects" as a whole, in some cases) with respect to the host vehicle are detected. Note that, the attitudes (yaw angles), the speeds, the accelerations, the decelerations, and the yaw rates of the other vehicles (2a to 2f) are referred to as "behaviors" of the other vehicles (2a to 2f) as a whole. In predetermined repeating cycles, the object detection unit 20 continuously detects the objects on and around the roadway in which the host vehicle 1 is traveling.

The object detection unit 20 integrates multiple detection results obtained from each of the multiple object detection sensors and outputs a single detection result for each object. Specifically, based on the locations and the behaviors of the other vehicles (2a to 2f) obtained from each of the object detection sensors, the most rational locations and behaviors of the other vehicles (2a to 2f), which obtain the fewest errors while taking into consideration error characteristics and the like of each object detection sensor, are calculated. Specifically, with the already-known sensor fusion technique, the detection results obtained by the multiple kinds of sensors are comprehensively evaluated, and thus more accurate detection results are obtained.

The object detection unit 20 tracks the detected other vehicles (2a to 2f). Specifically, based on the integrated detection results, the locations and the behaviors of the other vehicles (2a to 2f) outputted at different clock times are used to make the verification (association) of the identities of the other vehicles (2a to 2f) during the different clock times. Note that, the behaviors of the other vehicles (2a to 2f) outputted at the different clock times are stored in a memory (storage device) in the controller 30 and used for the travel assistance for the host vehicle 1 described later.

The object detection unit 20 can obtain a road structure based on the static objects (for example, a road marking, a road sign, a curb stone, a guard rail, and a wall) except a stopping vehicle. For example, as disclosed in Japanese Patent Application Publication No. 2001-199260, the object detection unit 20 may recognize the host lane L1 and the adjacent lane L2 by detecting a white line with reference to image data of a camera. As the detection results, the object detection unit 20 outputs the data indicating the road structure and the data indicating the locations and the behaviors of the other vehicles in a zenithal diagram (FIG. 2) that is a view from the air above the host vehicle, for example.

The host vehicle location obtainment unit 10 includes a location detection sensor that measures the location (absolute location) and the attitude (absolute attitude) of the host vehicle 1 in the terrestrial coordinates, such as a reception device mounted in the host vehicle 1 to receive GPS (global positioning system) signals. Additionally, the host vehicle location obtainment unit 10 includes an arithmetic processing circuit that performs odometry and dead reckoning. Specifically, the host vehicle location obtainment unit 10 can measure the relative location, the relative attitude, and the speed of the host vehicle 1 with respect to a predetermined reference point by using a wheel speed sensor that detects the wheel speed of each wheel of the host vehicle 1, a rudder angle sensor that detects the steering angle of a steering wheel, and the arithmetic processing circuit. The information indicating the absolute location, the absolute attitude, the relative location, and the relative attitude of the host vehicle 1 is referred to as "information indicating the location and the attitude of the host vehicle 1". The host vehicle location obtainment unit 10 can obtain the location and the attitude of the host vehicle 1 on a map based on the information indicating the location and the attitude of the host vehicle. The map is indicated by map data stored in advance in the memory in the controller 30.

Note that, the map data may not be stored in advance in the memory in the controller 30. When the map data is not stored, the controller 30 can obtain the map data from outside the vehicle through vehicle-to-vehicle or vehicle-to-infrastructure communications of the intelligent transport system (ITS) or the universal traffic management system (UTMS) or through mobile communications such as 3G and LTE, for example.

As with the map data, the controller 30 may obtain the data indicating the road structure around the host vehicle 1 and the data indicating the locations and the behaviors of the other vehicles (2a to 2f) around the host vehicle 1 from outside the vehicle through the vehicle-to-vehicle or vehicle-to-infrastructure communications or through the mobile communications such as 3G and LTE, instead of the object detection unit 20.

The controller 30 can assist the merging of the host vehicle 1 into the adjacent lane based on the data indicating the road structure and the locations and the behaviors of the other vehicles (2a to 2f) obtained by the object detection unit 20 or from outside the vehicle and the data indicating the current location of the host vehicle 1 obtained by the host vehicle location obtainment unit 10.

The controller 30 is a general-purpose microcomputer including a CPU (central processing device: control unit), a memory (storage) such as a RAM and a ROM, and an input and output unit. The microcomputer is installed with a computer program (travel assistance program) for functioning the microcomputer as a travel assistance device. The microcomputer functions as multiple information processing circuits (31 to 37) included in the travel assistance device by executing the computer program. Note that, here is described an example of implementing the multiple information processing circuits (31 to 37) included in the travel assistance device by using software. Needless to say, it is also possible to form the information processing circuits (31 to 37) by preparing hardware dedicated to execute the information processings described below. Additionally, the multiple information processing circuits (31 to 37) may be formed of individual hardware. Moreover, the information processing circuits (31 to 37) may be used as an electronic control unit (ECU) used for other controls concerning the host vehicle. In this embodiment, as an example, the microcomputer also implements information processing circuits (38, 39) that execute automated driving of the host vehicle.

The controller 30 includes a merging destination selection unit 30a, a host vehicle route generation unit 38, and a vehicle control unit 39 as the multiple information processing circuits (30a, 38, 39). Note that, the travel assistance device according to the first embodiment is implemented by the merging destination selection unit 30a.

Based on the merging history and the locations of the other vehicles (2c to 2e) traveling in the adjacent lane L2 in the lane direction within the mergeable section Pmer, the merging destination selection unit 30a selects a merging destination vehicle out of the multiple other vehicles (2a to 2f) that will travel behind the host vehicle 1 when the host vehicle 1 merges into the adjacent lane L2. Specifically, based on the "merging failure expectation", which is the expectation that the host vehicle 1 will fail in merging into the adjacent lane L2, the merging destination selection unit 30a selects the merging destination vehicle out of the multiple other vehicles (2a to 2f) that will travel behind the host vehicle 1 when the host vehicle 1 merges into the adjacent lane L2. That is, the merging destination vehicle, which is expected to give way to the host vehicle 1 expressing the intention to merge into the adjacent lane L2 from the host lane L1, is selected out of the other vehicles (2a to 2f) traveling in the host lane L1 or the adjacent lane L2. The merging destination vehicle may be a vehicle that will travel in front of the host vehicle 1 when the host vehicle 1 merges into the adjacent lane L2.

The merging destination selection unit 30a includes a mergeable section computation unit 31, a second failure expectation calculation unit 32, a merging determination unit 33, a merging history generation unit 34, a first failure expectation calculation unit 35, an integration unit 36, and a merging destination vehicle selection unit 37.

Based on the data indicating the lane structure, the mergeable section computation unit 31 computes the mergeable section Pmer within which the host vehicle 1 can merge into the adjacent lane L2. For example, in the example illustrated in FIG. 2, the locations of a start point p1 and a termination point p4 of the mergeable section Pmer on the map are identified. The mergeable section computation unit 31 may not identify many locations as long as the mergeable section computation unit 31 identifies at least the location of the termination point p4 of the mergeable section Pmer on the map.

The second failure expectation calculation unit 32 calculates a second merging failure expectation, which is an expectation that the host vehicle 1 will fail in merging at each location in the lane direction within the mergeable section Pmer. FIG. 2 illustrates an example of a distribution of the second merging failure expectations calculated by the second failure expectation calculation unit 32. Within the mergeable section Pmer, the second merging failure expectation at the termination point p4 is the highest, while the second merging failure expectation at the start point p1 is the lowest. Within the mergeable section Pmer, the second merging failure expectation is higher as coming closer to the termination point p4. In the example of FIG. 2, the second merging failure expectation has a proportional relationship to the distance to the termination point p4. The second merging failure expectation has a proportional relationship to the distance from the termination point p4. Needless to say, the distribution of the second merging failure expectations illustrated in FIG. 2 is an example. For example, it is also possible to indicate the distribution of the second merging failure expectations by a function of quadratic or more of the distance from the termination point p4.

When the host vehicle 1 travels in the host lane L1 near to the termination point p4 of the mergeable section Pmer and merges into the adjacent lane L2 immediately before the termination point p4, in many cases, the lane change is likely to be hasty or aggressive more than a case of merging near the start point p1. Additionally, drivers of the other vehicles forming the line of vehicles gets the impression of a bad driving manner from the host vehicle 1 that overtakes the other vehicles (2c to 2e) in the mergeable section Pmer and attempts to merge immediately before the termination point p4. For this reason, when the merging into the adjacent lane L2 is performed immediately before the termination point p4, the risk of disrupting the flow of the entire traffic in the mergeable section Pmer is increased. Therefore, the second failure expectation calculation unit 32 calculates the higher second merging failure expectation as coming closer to the termination point p4. That is, the second failure expectation calculation unit 32 predicts that the expectation that the merging will fail is higher as coming closer to the termination point p4.

Additionally, the second failure expectation calculation unit 32 calculates the second merging failure expectations based on the lane structure and the change in the behavior of the host vehicle 1. For example, the higher second merging failure expectation is calculated as the acceleration or deceleration of the host vehicle 1 is higher. Thus, the second merging failure expectation is a merging failure expectation determined based on the actions concerning the merging of the host vehicle 1.

Based on the locations of the other vehicles (2a to 2f) traveling in the host lane L1 or the adjacent lane L2 within the mergeable section Pmer, the merging determination unit 33 determines whether the other vehicles (2a to 2f) merged into the adjacent lane L2. Specifically, first, the object detection unit 20 detects the temporal change in the locations of the other vehicles (2a to 2f) traveling in the host lane L1 or the adjacent lane L2 before the host vehicle 1 reaches the start point of the mergeable section Pmer, for example, 100 m before the start point p1. Then, based on the change in the locations in the lane width direction of the other vehicles (2a to 2f) within the mergeable section Pmer, the merging determination unit 33 determines whether the other vehicles (2a to 2f) performed the merging. For example, when the centers in the vehicle width direction of the other vehicles (2a to 2f) traveling in the host lane L1 cross over the lane boundary line of the host lane L1 and the adjacent lane L2, it is determined that the other vehicles (2a to 2f) merge into the adjacent lane L2. Otherwise, if a direction indicator is in operation, it may be determined that the merging is performed when the operation of the direction indicator is terminated. The merging determination unit 33 makes the determination whether the merging was performed about all the other vehicles (2a to 2f) traveling in the host lane L1 or the adjacent lane L2 detected by the object detection unit 20.

Based on the result of the merging determination by the merging determination unit 33, the merging history generation unit 34 generates the merging history, which is a history concerning the merging of each of the other vehicles (2a to 2f). Based on the actions among the other vehicles (2a to 2f) concerning the merging, the merging history generation unit 34 generates the merging history. The generated merging history is temporarily stored in the memory in the controller 30.

Specifically, the merging history generation unit 34 generates a pair of a first other vehicle and a second other vehicle to which the first other vehicle gave way during the merging. That is, a pair of an other vehicle that gave way and an other vehicle to which the way was given is generated. Additionally, the merging history generation unit 34 counts the number of times of giving way by the first other vehicle that gave way to the second other vehicle during the merging, and stores the counted number of times in the memory as a part of the merging history. Note that, "the number of times of giving way" indicates the number of times within the mergeable section Pmer and does not need to take into consideration the number of times in a different mergeable section. Additionally, the merging history generation unit 34 may store the deceleration for giving way by the first other vehicle that gave way to the second other vehicle for the merging, as a part of the merging history. Moreover, the merging history generation unit 34 may store a fact that the other vehicles rejected the merging request as the merging history. For example, the merging history generation unit 34 determines that the merging request from the other vehicle traveling in the host lane L1 is rejected by a vehicle travelling parallel to the other vehicle, when conditions (1) to (5) are satisfied.

(1) The other vehicle travels parallel to a specific other vehicle traveling in the adjacent lane L2 (parallel-traveling vehicle), (2) The other vehicle operates the direction indicator toward the parallel-traveling vehicle, (3) The other vehicle drives close to the adjacent lane L2, (4) The state of satisfying (1) to (3) is continued for a predetermined time period (for example, 10 to 30 seconds), and (5) After (4), the other vehicle does not merge in front of the parallel-traveling vehicle.

Based on the merging history, the first failure expectation calculation unit 35 calculates, for each of the other vehicles (2a to 2f), the first merging failure expectation which is an expectation that the host vehicle 1 will fail in merging in front of the other vehicle (any of 2a to 2f). That is, the first merging failure expectation is a merging failure expectation determined based on the past actions of the other vehicles (2a to 2f). The past actions of the other vehicles (2a to 2f) are actions concerning the merging of the other vehicles (2a to 2f) within the mergeable section Pmer.

Specifically, for both the first and second other vehicles making pair, the first failure expectation calculation unit 35 calculates the higher first merging failure expectation than that of the other vehicles not making pair. For example, as illustrated in FIG. 2, for a region (p2 to p3) including the first other vehicle 2c that gave way and the second other vehicle 2d to which the way was given, the first failure expectation calculation unit 35 calculates the higher first merging failure expectation than that of other regions. Additionally, for the first other vehicle, the higher first merging failure expectation is calculated as the number of times of giving way is greater. Moreover, for the first other vehicle, the higher first merging failure expectation is calculated as the deceleration for giving way is greater. Furthermore, for the second other vehicle, the lower first merging failure expectation than that of the first other vehicle is calculated when a predetermined allowance condition is satisfied. The "predetermined allowance condition" is that the inter-vehicle distance between the second other vehicle and a second preceding vehicle traveling in front of the second other vehicle is equal to or greater than a predetermined value. Additionally, for the other vehicle that rejected the merging request, the first merging failure expectation higher than that of the first other vehicle that gave way to the second other vehicle during the merging is calculated.

The integration unit 36 calculates a post-integration failure expectation, which is an integration of the first merging failure expectation and the second merging failure expectation. For example, as illustrated in FIG. 2, it is possible to calculate the post-integration failure expectation by totaling the first merging failure expectation and the second merging failure expectation for each location in the lane direction within the mergeable section Pmer. Then, based on the locations of the other vehicles (2a to 2f), the post-integration failure expectations are allocated to the other vehicles (2a to 2f), respectively. Thus, the integration unit 36 calculates the post-integration failure expectation for each of the other vehicles (2a to 2f). Note that, before the integration, each of the first merging failure expectation and the second merging failure expectation may be allocated to the corresponding other vehicles (2a to 2f). The integration unit 36 may weight both the first merging failure expectation and the second merging failure expectation and integrate the weighted first merging failure expectation and second merging failure expectation to calculate the post-integration failure expectation.

Based on the post-integration failure expectation, the merging destination vehicle selection unit 37 selects the merging destination vehicle out of the other vehicles (2a to 2f) that will travel behind the host vehicle 1 when the host vehicle 1 merges into the adjacent lane L2. For example, the merging destination vehicle selection unit 37 can select the other vehicle of the lowest post-integration failure expectation out of the other vehicles (2a to 2f) as the merging destination vehicle. In the example of FIG. 2, the post-integration failure expectation (integrated cost) is the smallest near the start point p1 of the mergeable section Pmer. Consequently, the smallest post-integration failure expectation is allocated to the other vehicle 2b near the start point p1. Thus, the merging destination vehicle selection unit 37 selects the other vehicle 2b as the merging destination vehicle.

Based on the data indicating the road structure and the behaviors of the other vehicles (2a to 20 and the location information of the host vehicle 1, the host vehicle route generation unit 38 generates a travel route of the host vehicle 1 for the merging into the adjacent lane L2 in front of the selected merging destination vehicle 2b. The travel route for attempting the merging into the adjacent lane L2 is calculated at a location away from the other vehicle 2c traveling in front of the merging destination vehicle 2b at a predetermined distance in the lane direction. The travel route includes not only the temporal change in the location of the host vehicle but also the temporal change in the traveling speed. Note that, any method of generating the travel route may be used. The host vehicle route generation unit 38 may use an already-known method to generate the travel route of the host vehicle 1.

The vehicle control unit 39 drives at least one of a steering actuator, an accel pedal actuator, and a brake pedal actuator based on the self location computed by the host vehicle location obtainment unit 10 such that the host vehicle 1 travels according to the host vehicle route generated by the host vehicle route generation unit 38. Note that, although a case of making a control according to the host vehicle route is described in the first embodiment, the host vehicle 1 may be controlled without generating the host vehicle route. In this case, it is also possible to make a control based on the relative distance with the other vehicles (2a to 2f) or the difference of the attitude angles between the other vehicles (2a to 2f) and the host vehicle 1. The vehicle control unit 39 repeatedly determines whether the merging destination vehicle 2b allows the lane change by the host vehicle 1. The vehicle control unit 39 determines that the merging destination vehicle 2b allows the lane change by the host vehicle 1 when the inter-vehicle distance between the merging destination vehicle 2b and the other vehicle 2c traveling in front of the merging destination vehicle 2b is equal to or greater than a value required for the safe lane change by the host vehicle 1.

Figure 1:
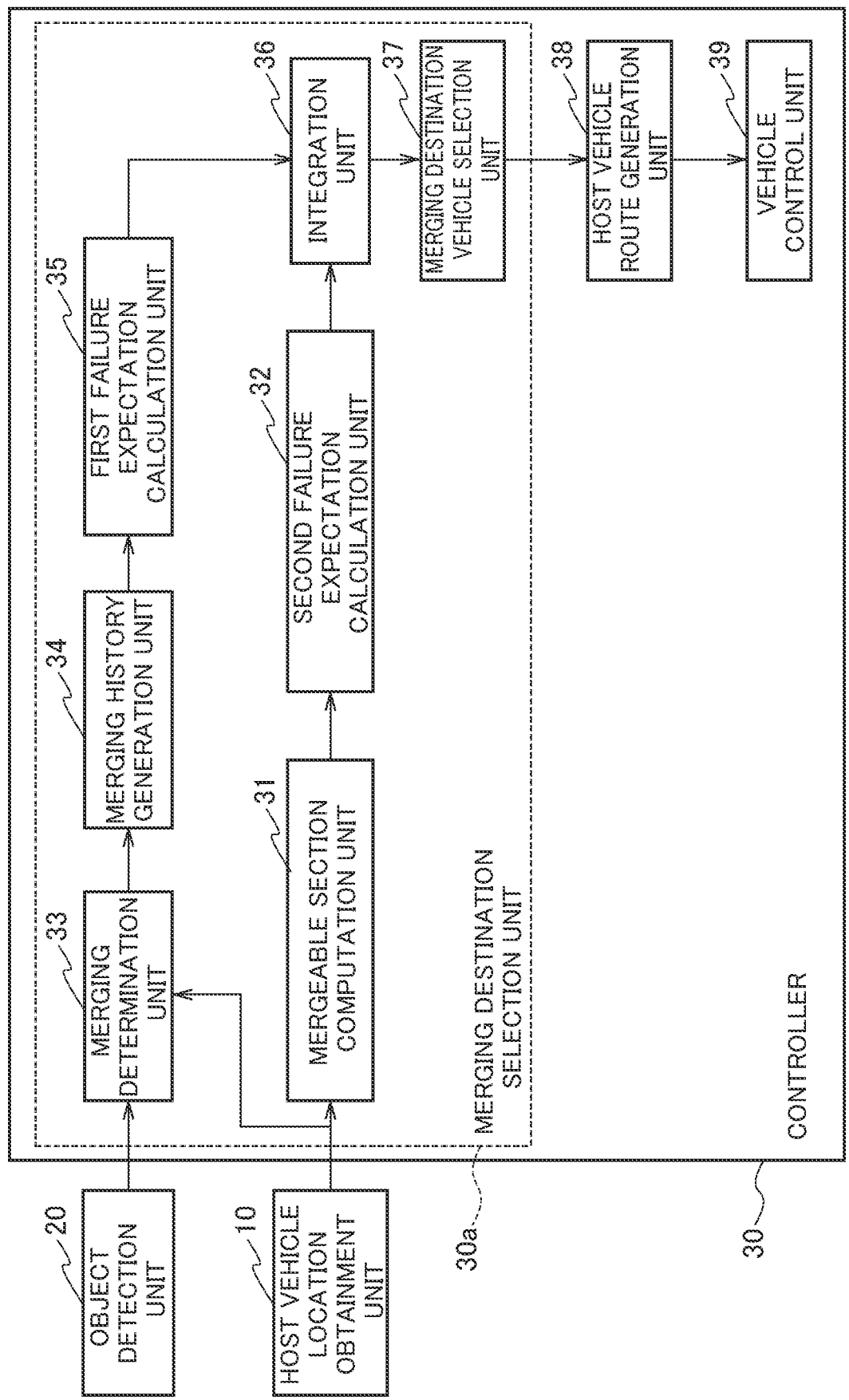
FIG. 1 is a schematic diagram illustrating an overall configuration of a vehicle control device including a travel assistance device according to a first embodiment.
Figure 3:
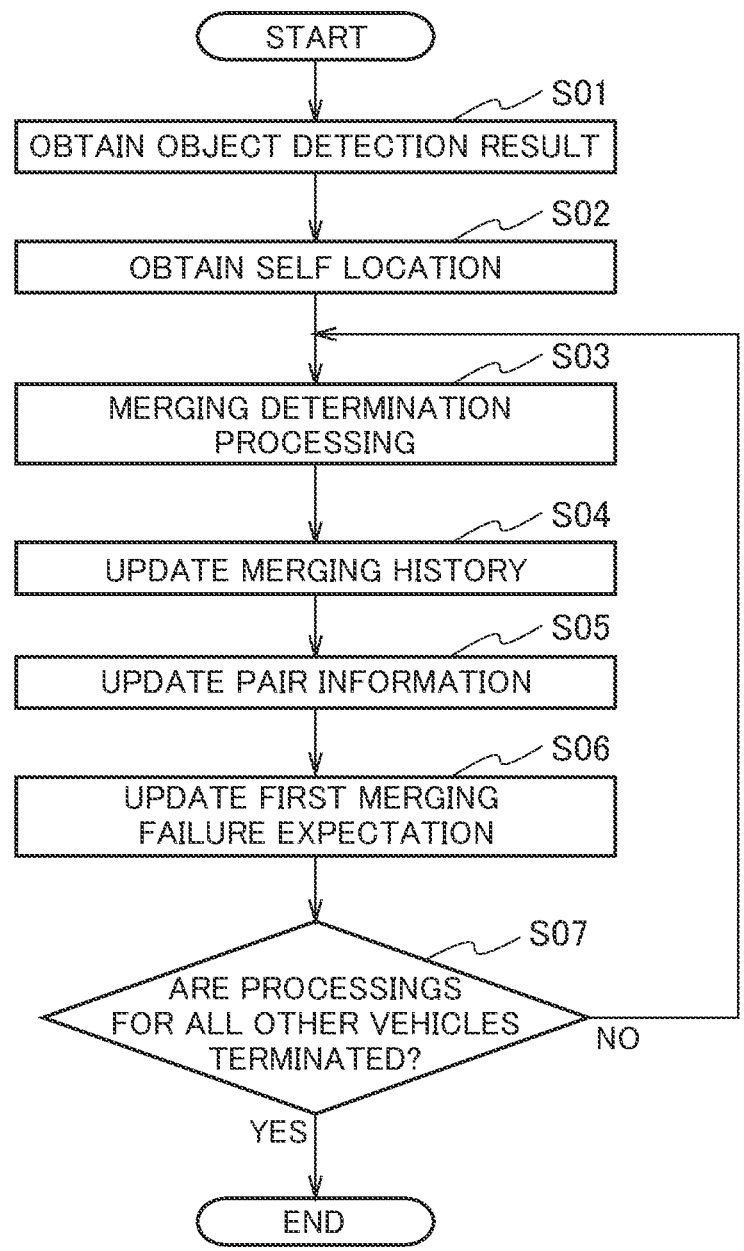
FIG. 3 is a flowchart describing a procedure for calculation of the first merging failure expectations in a travel assistance method according to the first embodiment.
Figure 4:
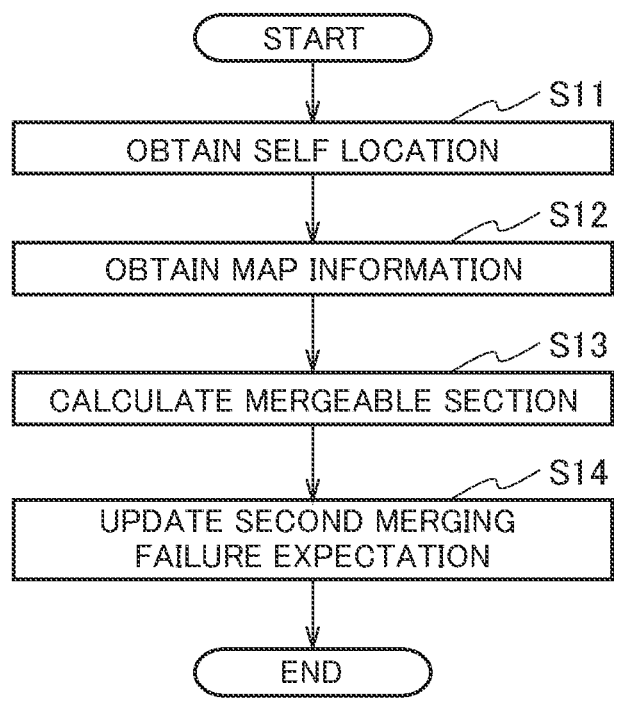
FIG. 4 is a flowchart describing a procedure for calculation of the second merging failure expectations in the travel assistance method according to the first embodiment.
Figure 5:
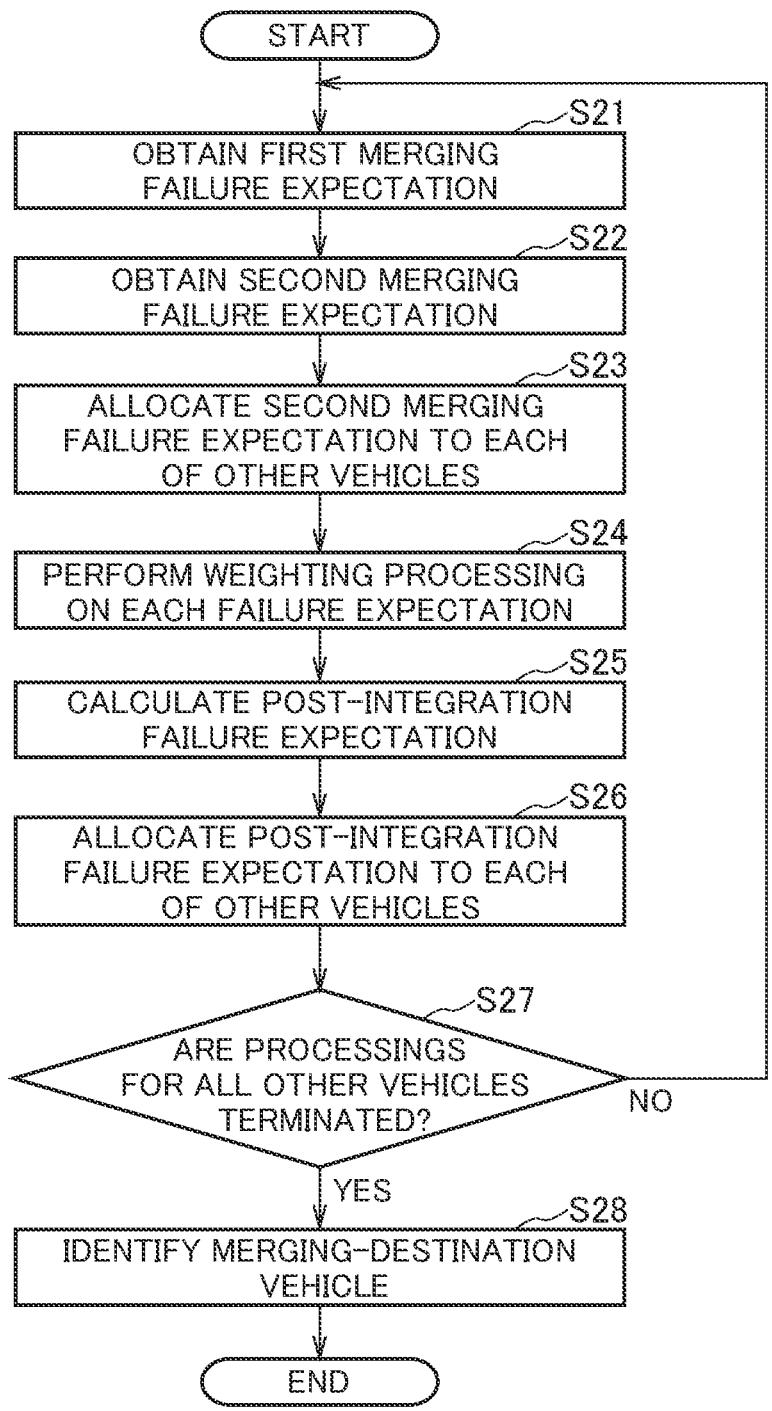
FIG. 5 is a flowchart describing a procedure for integration of the first merging failure expectations and the second merging failure expectations and identification of a merging destination vehicle in the travel assistance method according to the first embodiment.

Operations of the travel assistance device according to the first embodiment, that is, operations of the merging destination selection unit 30a in FIG. 1 are described with reference to FIGS. 3 to 5. First, the procedure for the calculation of the first merging failure expectations is described with reference to a flowchart of FIG. 3.

First, in step S01, the merging destination selection unit 30a obtains the data indicating the road structure and the data indicating the locations and the behaviors of the other vehicles. The merging destination selection unit 30a can obtain the data from the object detection unit 20 or outside the vehicle through the mobile communications.

The process proceeds to step S02, and the host vehicle location obtainment unit 10 obtains the current location of the host vehicle 1 from the location detection sensor mounted in the host vehicle 1 or outside the vehicle through the mobile communications. The process proceeds to step S03, and the merging determination unit 33 determines whether the other vehicles (2a to 2f) merged into the adjacent lane L2, based on the locations of the other vehicles (2a to 2f) traveling in the host lane L1 or the adjacent lane L2 within the mergeable section Pmer.

The process proceeds to step S04, and the merging history generation unit 34 updates the merging history, which is the history concerning the merging of each of the other vehicles (2a to 20, based on the result of the merging determination by the merging determination unit 33. Note that, the merging history is generated repeatedly, and a new history is added to an old history. Consequently, in step S04, the merging history generation unit 34 can update the merging history. The same applies to an "update" for other information. That is, when the same kind of information is repeatedly obtained at predetermined time intervals and the new information is added to the old information, this is referred to as the "update".

The process proceeds to step S05, and the merging history generation unit 34 updates the information (pair information) on the pair of the other vehicle that gave way and the other vehicle to which the way was given, based on the result of the merging determination by the merging determination unit 33. The process proceeds to step S06, and the first failure expectation calculation unit 35 updates the first merging failure expectation for each of the other vehicles (2a to 2f), based on the merging history including the updated pair information. That is, the first failure expectation calculation unit 35 updates the first merging failure expectations based on the past actions of the other vehicles (2a to 2f).

In step S07, whether the processings of steps S03 to S06 are executed for all the other vehicles (2a to 2f) is determined. The merging destination selection unit 30a repeatedly executes the processings of steps S03 to S06 for all the other vehicles (2a to 2f). When the processings of steps S03 to S06 for the other vehicles (2a to 2f) are terminated (YES in S07), the flowchart of FIG. 3 is terminated.

Next, the procedure for the calculation of the second merging failure expectations is described with reference to a flowchart of FIG. 4. First, in step S11, the host vehicle location obtainment unit 10 obtains the current location of the host vehicle 1 from the location detection sensor mounted in the host vehicle 1 or outside the vehicle through the mobile communications.

The process proceeds to step S12, and the mergeable section computation unit 31 reads map data around the host vehicle 1 out of the map data stored in advance in the memory in the controller 30. Note that, the mergeable section computation unit 31 may obtain the information indicating the self location and the map data from outside the vehicle through the vehicle-to-vehicle communications, the vehicle-to-infrastructure communications, and the mobile communications.

The process proceeds to step S13, and the mergeable section computation unit 31 computes the mergeable section Pmer in which the host vehicle 1 can merge into the adjacent lane L2, based on the information indicating the self location and the map data. Specifically, the mergeable section computation unit 31 obtains the data indicating the lane structure around the host vehicle 1 based on the information indicating the self location and the map data and identifies the mergeable section Pmer based on the data indicating the lane structure.

The process proceeds to step S14, and the second failure expectation calculation unit 32 updates the second merging failure expectation for each location in the lane direction within the mergeable section Pmer, the second merging failure expectation being the expectation that the host vehicle 1 will fail in merging in the corresponding location. After executing step S14, the flowchart of FIG. 4 is terminated.

Next, the procedure for the integration of the first merging failure expectations and the second merging failure expectations and the identification of the merging destination vehicle is described with reference to a flowchart of FIG. 5. First, in step S21, the integration unit 36 reads the first merging failure expectations for the other vehicles (2a to 2f) updated through the flowchart of FIG. 3. The process proceeds to step S22, and the integration unit 36 reads the second merging failure expectations for the other vehicles (2a to 2f) updated through the flowchart of FIG. 4.

The process proceeds to step S23, and the integration unit 36 allocates the second merging failure expectations to the other vehicles (2a to 2f). Since the second merging failure expectations are determined for the respective locations in the lane direction within the mergeable section Pmer, the integration unit 36 allocates the second merging failure expectations in the locations of the other vehicles (2a to 2f) to the vehicles (2a to 2f).

The process proceeds to step S24, and the integration unit 36 weights both the first merging failure expectations and the second merging failure expectations. The process proceeds to step S25, and the integration unit 36 integrates the weighted first merging failure expectations and second merging failure expectations and calculates the post-integration failure expectations. The process proceeds to step S26, and the integration unit 36 allocates the post-integration failure expectations in the locations of the other vehicles (2a to 2f) to the vehicles (2a to 2f).

In step S27, whether the processings of steps S21 to S26 are executed for all the other vehicles (2a to 2f) is determined. The integration unit 36 repeatedly executes the processings of steps S21 to S26 for all the other vehicles (2a to 2f). When all the processings of steps S21 to S26 are terminated for the other vehicles (2a to 2f) (YES in S27), the process proceeds to step S28.

In step S28, based on the post-integration failure expectations, the merging destination vehicle selection unit 37 selects the merging destination vehicle out of the other vehicles (2a to 20 that will travel behind the host vehicle 1 when the host vehicle 1 merges into the adjacent lane L2. That is, the merging destination vehicle is a vehicle to which the host vehicle 1 expresses the intention to merge. For example, the merging destination vehicle selection unit 37 can select the other vehicle of the lowest post-integration failure expectation as the merging destination vehicle.

As described above, it is possible to obtain the following operations and effects according to the first embodiment.

The merging destination selection unit 30a generates the merging history of each of the other vehicles (2a to 2f) based on the locations of the other vehicles (2a to 2f) and selects the merging destination vehicle based on the merging history of the each of the other vehicles (2a to 2f) and the locations of the other vehicles (2a to 2f) traveling in the adjacent lane L2 in the lane direction within the mergeable section Pmer. Consequently, it is possible to select the merging destination vehicle from both the perspectives of the other vehicles (2a to 2f) and the host vehicle 1. Thus, since it is possible to properly select the other vehicle that allows easy merging, the merging destination selection unit 30a can assist the proper merging of the host vehicle 1 into the adjacent lane L2.

Note that, based on the merging history of each of the other vehicles (2a to 2f), the merging destination selection unit 30a calculates the first merging failure expectation. That is, based on the past actions concerning the merging of the other vehicles (2a to 2f), the first merging failure expectation, which is the expectation that the host vehicle 1 will fail in merging in front of the other vehicles (2a to 2f), is calculated. On the other hand, based on the location of each of the other vehicles (2a to 2f) in the lane direction within the mergeable section Pmer, the merging destination selection unit 30a calculates, for each of the other vehicles (2a to 2f), the second merging failure expectation, which is the expectation that the host vehicle will fail in merging in front of or behind the other vehicle. That is, the second merging failure expectation is a merging failure expectation based on future actions concerning the merging of the host vehicle 1. Based on the post-integration failure expectation that is the integration of the two merging failure expectations, the merging destination selection unit 30a selects the merging destination vehicle.

As the location in which the host vehicle 1 merges comes closer to the termination point p4 of the mergeable section Pmer, the other vehicles (2a to 2f) traveling in the adjacent lane L2 feel that the merging is "unfair", and thus the probability that the other vehicles (2a to 2f) do not give way is increased. In order to prevent such a situation, the higher second merging failure expectation is generated as coming closer to the termination point p4, and thus it is possible to select the proper merging destination vehicle.

Based on the actions concerning the merging among the other vehicles (2a to 2f), the merging destination selection unit 30a generates the merging history. It is possible to generate the proper merging history based on the actions among the other vehicles (2a to 2f) such as giving way or getting way.

The merging destination selection unit 30a generates the pair of the first other vehicle 2c and the second other vehicle 2d to which the way was given by the first other vehicle 2c during the merging, as the merging history. It is possible to specifically store the actions concerning the merging among the other vehicles.

The merging destination selection unit 30a counts the number of times of giving way by the first other vehicle 2c that gave way to the second other vehicle 2d during the merging, as the merging history. There is the basic psychology of humans (drivers) that one does not want to give way anymore as the number of times of giving way is increased. For this reason, it is possible to add the psychology of drivers to the merging history as the number of times. Thus, it is possible to reflect the psychology of drivers to the first merging failure expectation.

The merging destination selection unit 30a stores the deceleration for giving way by the first other vehicle 2c that gave way during the merging, as the merging history. As the deceleration was greater, the possibility that the lane change was unexpected for the first other vehicle 2c that gave way is higher, and the possibility of giving way again is lower. Accordingly, it is possible to generate the proper merging history with the deceleration for giving way being stored as the merging history. Thus, it is possible to reflect the deceleration for giving way to the first merging failure expectation.

The merging destination selection unit 30a stores the fact that the other vehicles (2a to 2f) rejected the merging request as the merging history. The other vehicle that rejected the merging request is a vehicle that is unlikely to give way. Thus, it is possible to reflect the history of the past rejection of the merging request to the first merging failure expectation.

The merging destination selection unit 30a calculates the post-integration failure expectation for each of the other vehicles (2a to 2f). It is possible to calculate all the post-integration failure expectations for all the other vehicles (2a to 2f).

The merging destination selection unit 30a weights both the first merging failure expectations and the second merging failure expectations and integrates the weighted first merging failure expectations and second merging failure expectations to calculate the post-integration failure expectations. Since it is possible to weight each of the first merging failure expectations and the second merging failure expectations with arbitrary weights when integrating the merging failure expectations, it is possible to adjust the weights for the actions of the host vehicle 1 and the actions of the other vehicles (2a to 2f).

For both the first and second other vehicles (2c, 2d) making pair, the merging destination selection unit 30a calculates the higher first merging failure expectation than that of the other vehicles not making pair. The first and second other vehicles (2c, 2d) already experienced the merging event, and thus the possibility of allowing the additional merging is low. For this reason, it is possible to make the first and second other vehicles (2c, 2d) unlikely to be selected as the merging destination vehicle by allocating a high failure expectation to the first and second other vehicles (2c, 2d).

For the first other vehicle 2c, the merging destination selection unit 30a calculates the higher first merging failure expectation as the number of times of giving way is greater. It is possible to reflect the basic psychology of humans that the driver does not want to give way anymore as the number of times of giving way is increased, to the first merging failure expectation.

For the first other vehicle 2c, the merging destination selection unit 30a calculates the higher first merging failure expectation as the deceleration for giving way is greater. As the deceleration for giving way was greater, the possibility that the lane change was unexpected for the first other vehicle 2c that gave way is higher, and the possibility of giving way again is lower. Consequently, it is possible to correctly reflect the deceleration for giving way to the first merging failure expectation.

For the second other vehicle 2d, the merging destination selection unit 30a calculates the lower first merging failure expectation than that of the first other vehicle 2c when the predetermined allowance condition is satisfied. For the vehicle to which the way was given once, the merging failure expectation is calculated to be lower than that of the vehicle that gave way. Generally, the vehicle to which the way was given has the higher possibility of giving way to other vehicles. It is possible to reflect this possibility to the first merging failure expectation.

The predetermined allowance condition is that the inter-vehicle distance between the second other vehicle 2d and a second preceding vehicle 2e traveling in front of the second other vehicle 2d is equal to or greater than a predetermined value. When the vehicle to which the way was given has a space in front thereof, the vehicle has the high possibility of giving way. Consequently, it is possible to make a correct determination on the possibility of giving way to other vehicles by using the distance.

For the other vehicle that rejected the merging request, the merging destination selection unit 30a calculates the higher first merging failure expectation than that of the first other vehicle 2c that gave way to the second other vehicle 2d during the merging. It is possible to allocate the proper first merging failure expectation to the other vehicle that rejected the merging request, that is, a vehicle that is unlikely to give way.

Based on the lane structure and the changes in the behaviors of the host vehicle 1, the merging destination selection unit 30a calculates the second merging failure expectations. It is possible to correctly calculate the second merging failure expectations based on the actions of the host vehicle 1.

The merging destination selection unit 30a calculates the higher second merging failure expectation as the acceleration or the deceleration of the host vehicle 1 is greater. The driver of the host vehicle 1 desires to avoid the merging that causes the great acceleration or deceleration of the host vehicle 1 as much as possible. The merging destination selection unit 30a can calculate the high second merging failure expectation for the location in which the acceleration or the deceleration of the host vehicle 1 is great. It is possible to make the other vehicle at the location in which the acceleration or the deceleration of the host vehicle 1 is great during the merging unlikely to be selected as the merging destination vehicle.

The merging destination selection unit 30a selects the other vehicle of the lowest post-integration failure expectation as the merging destination vehicle. The post-integration failure expectations are generated from the first merging failure expectations generated based on the merging history of the other vehicles (2a to 2f) and the second merging failure expectations generated based on the merging of the host vehicle 1. Consequently, it is possible to present a proper merging destination from the perspectives of the action history of the other vehicles (2a to 2f) and the actions of the host vehicle 1.

Second Embodiment

Figure 6:
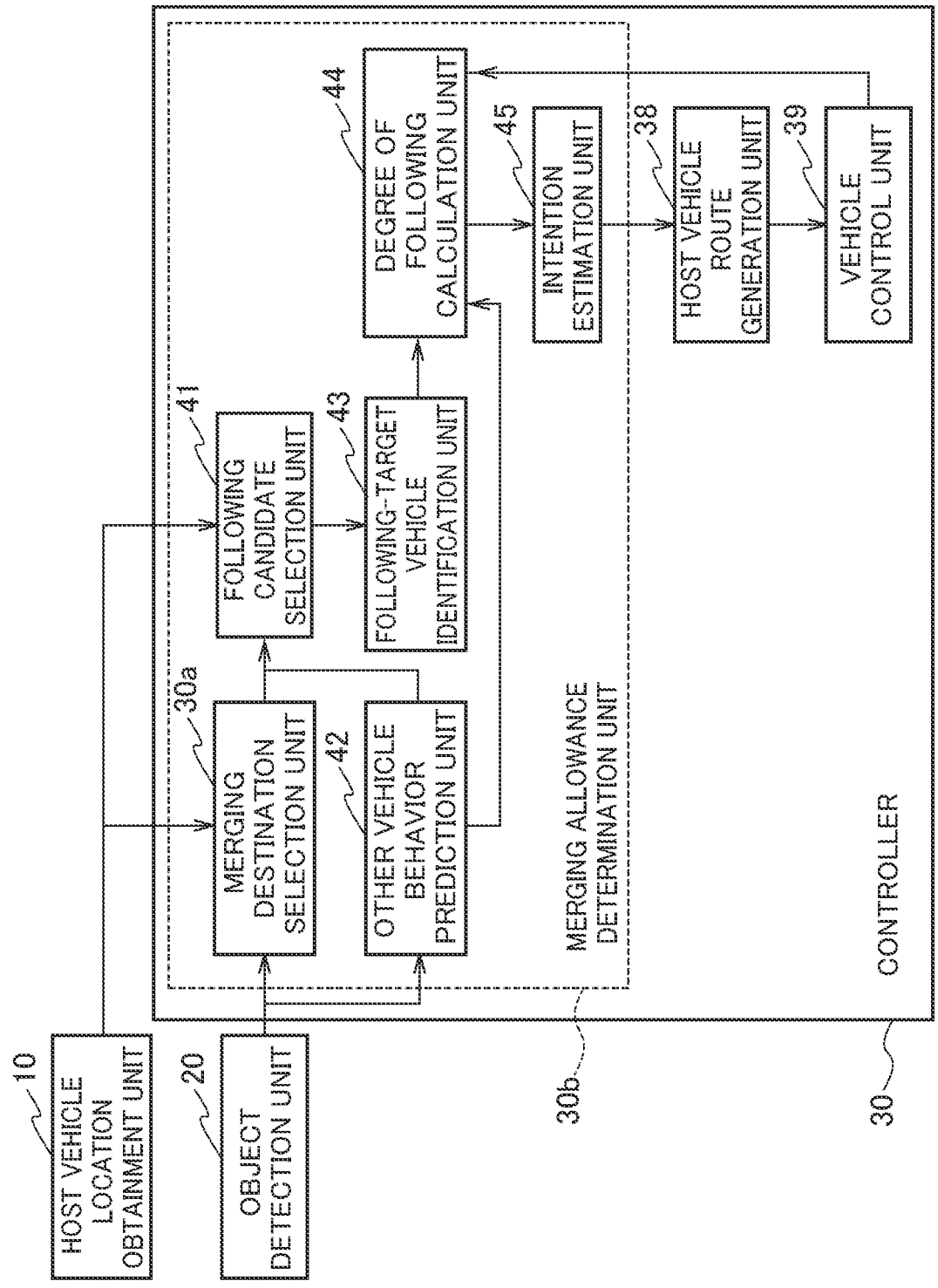
FIG. 6 is a schematic diagram illustrating an overall configuration of a vehicle control device including a travel assistance device according to a second embodiment.

An overall configuration of a vehicle control device including a travel assistance device according to the second embodiment is described with reference to FIG. 6. The travel assistance device according to the second embodiment, for a case where the host lane L1 in which the host vehicle 1 is traveling merges into the adjacent lane L2 adjacent to the host lane L1 in front of the host vehicle 1, assists the merging of the host vehicle 1 into the adjacent lane L2. The vehicle control device according to the second embodiment includes the host vehicle location obtainment unit 10, the object detection unit 20, and the controller 30. Note that, since the host vehicle location obtainment unit 10 and the object detection unit 20 are the same as that in the first embodiment, the duplicated descriptions are omitted herein.

The controller 30 according to the second embodiment includes the merging destination selection unit 30a, a merging allowance determination unit 30b, the host vehicle route generation unit 38, and the vehicle control unit 39 as the multiple information processing circuits (30a, 30b, 38, 39). Note that, the controller 30 according to the second embodiment is different from the controller 30 according to the first embodiment illustrated in FIG. 1 in that the controller 30 according to the second embodiment further includes the merging allowance determination unit 30b. Since the other constituents, the merging destination selection unit 30a, the host vehicle route generation unit 38, and the vehicle control unit 39, are the same as that of the controller 30 according to the first embodiment, the duplicated descriptions are omitted herein.

The merging allowance determination unit 30b is described specifically. The merging allowance determination unit 30b determines whether the merging destination vehicle selected by the merging destination selection unit 30a allows the merging of the host vehicle 1.

Figure 7A:
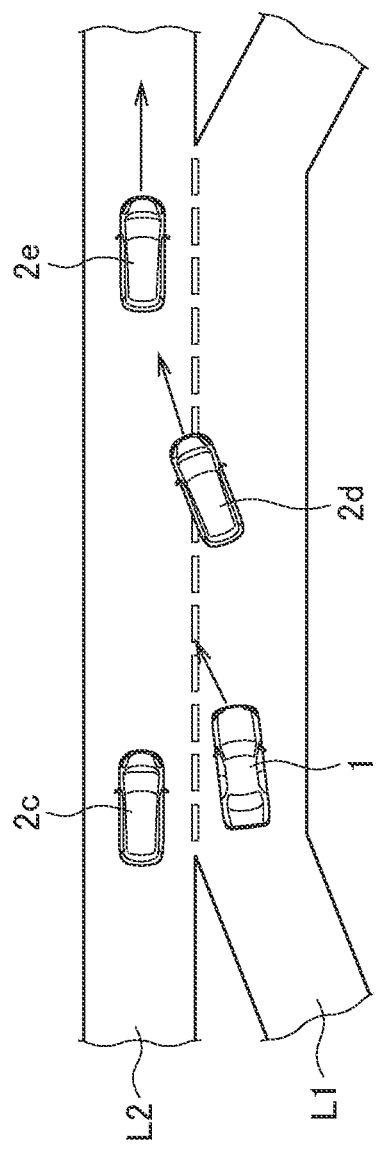
FIG. 7A is a diagram illustrating an example of a traveling scene where a merging allowance determination unit 30$b$ according to the second embodiment functions effectively.

The merging allowance determination unit 30b functions effectively in a traveling scene as illustrated in FIG. 7A, for example. The other vehicle 2d traveling in front of the host vehicle 1 in the host lane L1 attempts to merge behind the other vehicle 2e. Then, the other vehicle 2c traveling behind the other vehicle 2e in the adjacent lane L2 allows the merging of the other vehicle 2d in front of the other vehicle 2c. That is, the other vehicle 2c gives way to the other vehicle 2d attempting to merge.

The merging destination selection unit 30a selects the other vehicle 2c as the merging destination vehicle. In response, the merging allowance determination unit 30b determines whether the other vehicle 2c allows the merging of the host vehicle 1. The merging allowance determination unit 30b identifies the following-target vehicle as the target followed by the other vehicle 2c and determines whether the merging destination vehicle 2c allows the merging of the host vehicle 1 based on the amount of changes (difference) in the degree of following the following-target vehicle by the merging destination vehicle 2c.

In the traveling scene illustrated in FIG. 7A, the merging allowance determination unit 30b identifies the other vehicle 2d as the following-target vehicle. Consequently, the merging allowance determination unit 30b can make the determination below accurately based on the amount of changes (difference) in the degree of following the following-target vehicle 2d by the merging destination vehicle 2c. That is, the merging allowance determination unit 30b can accurately determine whether the other vehicle 2c only allows the merging of the other vehicle 2d or allows not only the merging of the other vehicle 2d but also the merging of the host vehicle 1. Note that, the traveling scene as illustrated in FIG. 7A is an example of the traveling scene where the travel assistance method and the travel assistance device according to the second embodiment function effectively, and the scope of applying the travel assistance method and the travel assistance device according to the second embodiment is not limited by the traveling scene.

Hereinafter, operations of the merging allowance determination unit 30b are described specifically with reference to FIG. 6. The merging allowance determination unit 30b includes a following candidate selection unit 41, an other vehicle behavior prediction unit 42, a following-target vehicle identification unit 43, a degree of following calculation unit 44, and an intention estimation unit 45.

Based on the temporal change in the locations and the behaviors of the other vehicles (2a to 20 tracked by the object detection unit 20, the other vehicle behavior prediction unit 42 predicts the future locations and behaviors of the other vehicles (2a to 2f). Otherwise, as disclosed in Japanese Patent Application Publication No. 2001-199260, the movement directions of the other vehicles (2a to 2f) may be predicted based on the vehicle speeds, the steering wheel rudder angles, the yaw rates, and the road friction coefficients of the other vehicles (2a to 2f). Additionally, the other vehicle behavior prediction unit 42 may predict the lane changes of the other vehicles (2a to 2f) based on the future locations and behaviors of the other vehicles (2a to 2f).

The following candidate selection unit 41 detects the other vehicles traveling in front of the merging destination vehicle 2c out of the other vehicles traveling in either one of the host lane L1, the adjacent lane L2, and a lane adjacent to the adjacent lane L2. In the traveling scene illustrated in FIGS. 2 and 7A, the lane adjacent to the adjacent lane L2 is the host lane L1 only. However, in the second embodiment, when there is a lane adjacent to the adjacent lane L2 on the opposite side of the host lane L1, the lane adjacent to the adjacent lane L2 on the opposite side of the host lane L1 is also included. That is, in the traveling scene illustrated in FIGS. 2 and 7A, it is assumed that there is an additional lane in the advancing direction adjacent to the adjacent lane L2 on the left side. The following candidate selection unit 41 detects the other vehicles traveling in front of the merging destination vehicle 2c out of the other vehicles traveling in either of the adjacent lane L2 and the lane adjacent to the adjacent lane L2. For example, in the traveling scene of FIG. 2, the following candidate selection unit 41 detects three other vehicles (2d, 2e, 20 as the other vehicles traveling in front of the merging destination vehicle 2c.

Then, the following candidate selection unit 41 selects other vehicles (hereinafter, referred to as a "following-candidate vehicles") that may be a candidate for the target followed by the merging destination vehicle out of the other vehicles traveling in front of the merging destination vehicle 2c. For example, based on the locations and the behaviors of the other vehicles tracked by the object detection unit 20, the following candidate selection unit 41 selects the other vehicle 2e traveling in front of the merging destination vehicle 2c in the adjacent lane L2 as the following-candidate vehicle. Based on the lane change by the other vehicle 2d predicted by the other vehicle behavior prediction unit 42, the other vehicle 2d attempting to merge into the adjacent lane L2 from the host lane L1 is selected as the following-candidate vehicle. That is, the following candidate selection unit 41 selects at least one of the other vehicle 2e traveling in front of the merging destination vehicle 2c and the other vehicle 2d attempting to merge between the merging destination vehicle 2c and the other vehicle 2e as the following-candidate vehicle. Thus, based on the lane structure and the traveling states of the other vehicles, the following candidate selection unit 41 selects the following-candidate vehicle. In this case, "the traveling states of the other vehicles" are at least one of the locations and the behaviors of the other vehicles tracked by the object detection unit 20 and the future locations and the behaviors of the other vehicles predicted by the object detection unit 20.

The following-target vehicle identification unit 43 identifies the following-target vehicle as the target followed by the merging destination vehicle out of the following-candidate vehicles. Specifically, based on the speed difference between the following-candidate vehicles and the merging destination vehicle, the following-target vehicle identification unit 43 identifies the following-target vehicle. For example, the following-candidate vehicle of the smallest speed difference is identified as the following-target vehicle. Otherwise, the following-target vehicle identification unit 43 may obtain the temporal change in the speed difference and identify the following-target vehicle based on the temporal change in the speed difference (speed difference profile). When the current speed difference is great but there is a temporal change of reducing the speed difference, the future speed difference may be prioritized over the current speed difference to identify the following-target vehicle.

Additionally, when there are multiple following-candidate vehicles that have the speed difference from the merging destination vehicle 2c equal to or smaller than a predetermined value, the following-target vehicle identification unit 43 identifies the following-candidate vehicle of the shortest distance from the merging destination vehicle in the lane direction out of those following-candidate vehicles as the following-target vehicle. As described above, the merging allowance determination unit 30b identifies a single following-target vehicle as the target followed by the merging destination vehicle out of the other vehicles detected by the object detection unit 20.

The degree of following calculation unit 44 calculates an initial degree of following. The "initial degree of following" is a degree of following the following-target vehicle by the merging destination vehicle when a predetermined initial condition is satisfied. The "degree of following" is calculated based on the inter-vehicle distance or the time headway between the following-target vehicle and the merging destination vehicle, for example. Specifically, the high degree of following is obtained as the inter-vehicle distance or the time headway is shorter and as the temporal change in the inter-vehicle distance or the time headway is smaller. The time headway is obtained by converting the inter-vehicle distance into time. Otherwise, the "degree of following" may be the inter-vehicle distance or the time headway itself.

The "predetermined initial condition" is that the other vehicle 2d (first preceding vehicle) traveling in front of the host vehicle 1 starts merging into the adjacent lane L2 or that the host vehicle 1 starts expressing the intention to merge into the adjacent lane L2. "The other vehicle 2d starts merging into the adjacent lane L2" may be determined by the merging determination unit 33 or may be predicted by the other vehicle behavior prediction unit 42. "The host vehicle 1 starts expressing the intention to merge into the adjacent lane L2" is, for example, to start the operation of the direction indicator toward the adjacent lane L2.

When the other vehicle 2d (first preceding vehicle) starts merging into the adjacent lane L2 and also the host vehicle 1 starts expressing the intention to merge into the adjacent lane L2 within a predetermined time, the degree of following calculation unit 44 calculates the initial degree of following when the other vehicle 2d (first preceding vehicle) starts merging into the adjacent lane L2.

Usually, in many cases, the host vehicle 1 starts expressing the intention to merge into the adjacent lane L2 within a predetermined time after the other vehicle 2d (first preceding vehicle) starts merging into the adjacent lane L2. When the lane change by the other vehicle 2d and the expression of intention by the host vehicle 1 occur within the predetermined time, the degree of following calculation unit 44 determines that the predetermined initial condition is satisfied when the other vehicle 2d (first preceding vehicle) starts merging into the adjacent lane L2 and calculates the initial degree of following. On the other hand, when there is no other vehicle 2d (first preceding vehicle) in front of the host vehicle 1, the degree of following calculation unit 44 determines that the predetermined initial condition is satisfied when the host vehicle 1 starts expressing the intention to merge into the adjacent lane L2 and calculates the initial degree of following.

The degree of following calculation unit 44 calculates a current degree of following, which is a degree of following after a predetermined time from the calculation of the initial degree of following. The predetermined time can be set arbitrarily, and in this embodiment, after the initial degree of following is calculated, the current degree of following is updated by repeating the calculation at a constant period of time.

The intention estimation unit 45 calculates the difference between the initial degree of following and the current degree of following. Specifically, the difference is calculated by subtracting the current degree of following from the initial degree of following or by subtracting the initial degree of following from the current degree of following. For example, when the "degree of following" is the inter-vehicle distance or the time headway itself, the intention estimation unit 45 repeatedly calculates the difference between the inter-vehicle distance or the time headway when the predetermined initial condition is satisfied and the current inter-vehicle distance or the current time headway, at a constant period of time.

Based on this difference, the intention estimation unit 45 determines whether the merging destination vehicle 2c allows the merging of the host vehicle. Specifically, the intention estimation unit 45 compares the initial degree of following and the current degree of following with each other to determine whether the inter-vehicle distance or the time headway required for the merging of the host vehicle 1 is added between the following-target vehicle and the merging destination vehicle 2c. Based on the result of the determination, the intention estimation unit 45 determines whether the merging destination vehicle 2c allows the merging of the host vehicle 1. When the result from the determination is positive, it is possible to determine that the merging destination vehicle 2c allows the merging of the host vehicle 1. On the other hand, when the result from the determination is negative, it is possible to determine that the merging destination vehicle 2c does not allow the merging of the host vehicle 1.

Figure 7B:
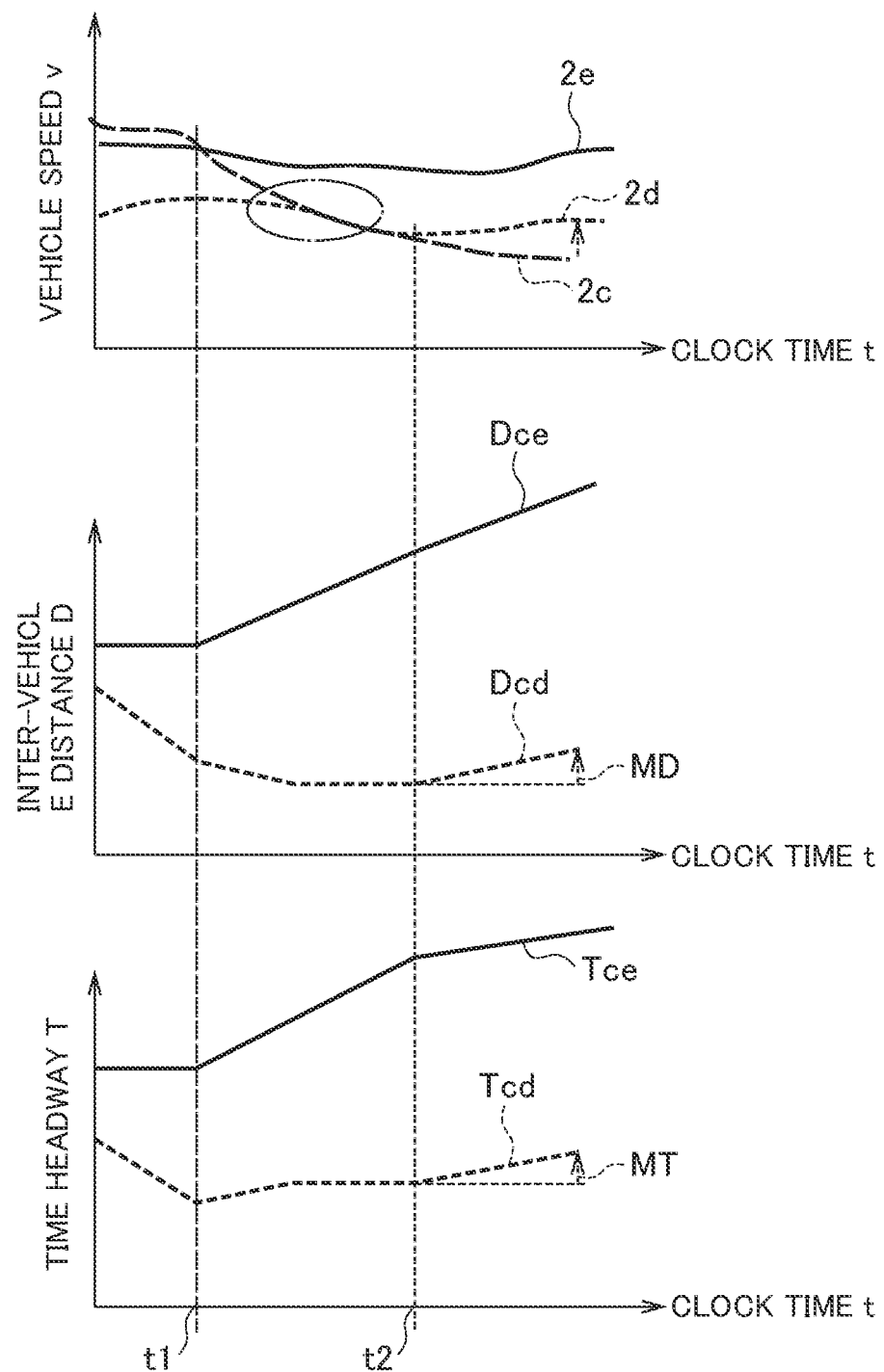
FIG. 7B is a graph illustrating temporal changes in speeds v, inter-vehicle distances (Dce, Dcd), and time headways (Tce, Tcd) of other vehicle 2$e$, other vehicle 2$d$ (first preceding vehicle, following-target vehicle), and other vehicle 2$c$ (merging destination vehicle) in the traveling scene illustrated in FIG. 7A.

FIG. 7B is a graph indicating the temporal changes in speeds v, inter-vehicle distances (Dce, Dcd), and time headways (Tce, Tcd) of the other vehicle 2e, the other vehicle 2d (first preceding vehicle, following-target vehicle), and the other vehicle 2c (merging destination vehicle) in the traveling scene illustrated in FIG. 7A. Note that, the inter-vehicle distance Dce indicates the inter-vehicle distance between the other vehicle 2c and the other vehicle 2e, and the inter-vehicle distance Dcd indicates the inter-vehicle distance between the other vehicle 2c and the other vehicle 2d. The time headway Tce indicates the time headway between the other vehicle 2c and the other vehicle 2e, and the time headway Tcd indicates the time headway between the other vehicle 2c and the other vehicle 2d.

Until a clock time t1, the other vehicle 2e and the other vehicle 2c travel in the same adjacent lane L2 at the almost same speeds, and the inter-vehicle distance Dce and the time headway Tce are substantially constant as well. At the clock time t1, the other vehicle 2d starts merging between the other vehicle 2e and the other vehicle 2c in the adjacent lane L2, and thereby the other vehicle 2c starts decelerating, and the inter-vehicle distance Dce and the time headway Tce starts getting longer as well.

Based on the temporal changes in the locations and the behaviors of the other vehicles (2c, 2d, 2e), the following-target vehicle identification unit 43 identifies the other vehicle 2d as the following-target vehicle. At the clock time t1, since the other vehicle 2d (first preceding vehicle) starts merging into the adjacent lane L2, the degree of following calculation unit 44 determines that the predetermined initial condition is satisfied. The degree of following calculation unit 44 calculates the initial degree of following the other vehicle 2d by the other vehicle 2c that is, specifically, the inter-vehicle distance Dcd and the time headway Tcd at the clock time t1.

After calculating the initial degree of following, the degree of following calculation unit 44 repeats the calculation at a constant period of time and calculates the current degree of following (inter-vehicle distance Dcd and time headway Tcd). Immediately after the clock time t1, since the traveling speed of the other vehicle 2c is faster than the traveling speed of the other vehicle 2d the inter-vehicle distance Dcd and the time headway Tcd are short; however, at a clock time t2, the traveling speed of the other vehicle 2c starts getting slower than the traveling speed of the other vehicle 2d, and the inter-vehicle distance Dcd and the time headway Tcd between the other vehicle 2c and the other vehicle 2d start getting longer as well.

The intention estimation unit 45 determines whether the increased amounts (MD, MT) of the inter-vehicle distance Dcd and the time headway Tcd after the clock time t2 are comparable to the inter-vehicle distance or the time headway that the host vehicle 1 requires for the merging. When they are comparable, it is possible to determine that the other vehicle 2c makes the inter-vehicle distance or the time headway for the merging of the host vehicle 1. In other words, it is possible to determine that the other vehicle 2c adjusts not only the traveling speed to only follow the following-target vehicle (other vehicle 2d) but also adjusts the traveling speed to follow the host vehicle 1 as well. Thus, in this case, the intention estimation unit 45 determines that the other vehicle 2c allows the merging of the host vehicle 1. On the other hand, when the state where the traveling speed of the other vehicle 2c is almost the same as the traveling speed of the other vehicle 2d is continued after the clock time t2, the increased amounts (MD, MT) are almost zero, and thus it is possible to determine that the other vehicle 2c allows the merging of the other vehicle 2d but not the merging of the host vehicle 1.

Figure 8:
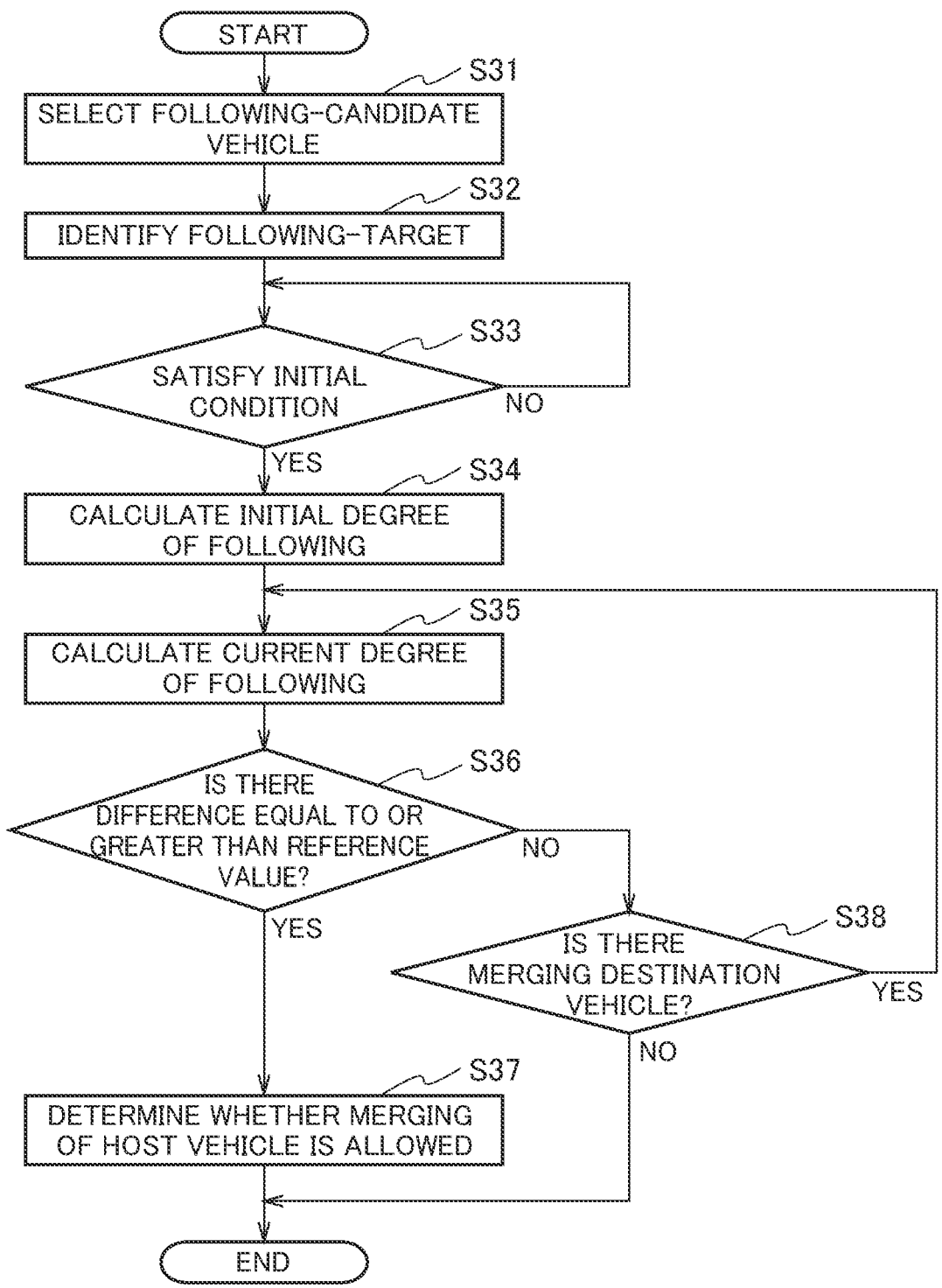
FIG. 8 is a flowchart describing a procedure for calculation of the first merging failure expectations in a travel assistance method according to the second embodiment.

Operations of the merging allowance determination unit 30b in FIG. 6 out of the operations of the travel assistance device according to the second embodiment are described with reference to a flowchart of FIG. 8. Note that, the operations of the merging destination selection unit 30a are the same as that of the first embodiment, and the duplicated descriptions are omitted herein.

First, in step S31, the following candidate selection unit 41 detects the other vehicle traveling in front of the merging destination vehicle 2c out of the other vehicles traveling in either of the host lane L1, the adjacent lane L2, and the lane adjacent to the adjacent lane L2. "In front of the merging destination vehicle 2c" means that the location in the lane direction is in front of the merging destination vehicle 2c. Then, based on the locations and the behaviors of the other vehicles and the lane change by the other vehicle 2d, the following candidate selection unit 41 selects the following-candidate vehicles (2d, 2e) that may be the candidates for the target followed by the merging destination vehicle 2c.

The process proceeds to step S32, and the following-target vehicle identification unit 43 identifies the following-target vehicle 2d as the target followed by the merging destination vehicle 2c out of the following-candidate vehicles (2d, 2e). Specifically, the following candidate selection unit 41 identifies the following-candidate vehicle (2d, 2e) of the smallest current or future speed difference between the following-candidate vehicles (2d, 2e) and the merging destination vehicle 2c as the following-target vehicle 2d.

The process proceeds to step S33, and the degree of following calculation unit 44 monitors the situation where the predetermined initial condition is satisfied. When the other vehicle 2d traveling in front of the host vehicle 1 starts merging into the adjacent lane L2 or the host vehicle 1 starts expressing the intention to merge into the adjacent lane L2, it is determined that the predetermined initial condition is satisfied (YES in S33), and the process proceeds to step S34.

In step S34, the degree of following calculation unit 44 calculates the initial degree of following the following-target vehicle 2d by the merging destination vehicle 2c (inter-vehicle distance or time headway) when the predetermined initial condition is satisfied. The process proceeds to step S35, and the degree of following calculation unit 44 calculates the current degree of following after a predetermined time lapsed after the calculation of the initial degree of following.

The process proceeds to step S36, and the intention estimation unit 45 calculates the difference between the initial degree of following in step S34 and the current degree of following in step S35. Whether the difference is equal to or greater than a predetermined reference value is determined. In this case, the "predetermined reference value" is the inter-vehicle distance or the time headway required for the merging of the host vehicle 1. When the difference is equal to or greater than the predetermined reference value (YES in S36), the process proceeds to step S37, and the intention estimation unit 45 determines that the merging destination vehicle 2c allows the merging of the host vehicle 1.

On the other hand, when the difference is smaller than the predetermined reference value (NO in S36), the process proceeds to step S38, the merging allowance determination unit 30b determines whether the detection of the merging destination vehicle 2c is possible. When the detection of the merging destination vehicle 2c is possible (YES in S38), the process returns to step S35, and the current degree of following is calculated again. Thus, when the difference is smaller than the predetermined reference value and also the detection of the merging destination vehicle 2c is possible, the degree of following calculation unit 44 repeats the calculation at a predetermined period of time to calculate the current degree of following. Once the detection of the merging destination vehicle 2c becomes impossible (NO in S38), the actor for the determination whether to allow the merging of the host vehicle 1 cannot be detected, and thus the processing is interrupted. When it is determined that the merging destination vehicle 2c allows the merging of the host vehicle 1, the host vehicle route generation unit 38 generates a travel route for the host vehicle 1 to merge in front of the merging destination vehicle 2c.

As described above, it is possible to obtain the following operations and effects according to the second embodiment.

The merging allowance determination unit 30b identifies the following-target vehicle 2d as the target followed by the merging destination vehicle 2c out of the other vehicles traveling in either of the host lane L1, the adjacent lane L2, and another lane adjacent to the adjacent lane L2, and determines whether the merging destination vehicle 2c allows the merging of the host vehicle 1 based on the temporal change (difference) in the degree of following the following-target vehicle 2d by the merging destination vehicle 2c. Consequently, it is possible to properly determine whether the merging of the other vehicle 2d is allowed or the merging of the host vehicle 1 is allowed.

Based on the lane structure and the traveling states of the other vehicles, the following candidate selection unit 41 selects the following-candidate vehicles. In the situation where the vehicles decelerate while traveling along the lanes, it is possible to select the following-candidate vehicles properly.

The "traveling states of the other vehicles" are the locations and the behaviors of the other vehicles tracked by the object detection unit 20. With this, for example, vehicles parked on a shoulder on the same lane are not selected as the following-candidate vehicles, and it is possible to properly select the vehicles traveling in front of the merging destination vehicle 2c.

The "traveling states of the other vehicles" are at least one of the future locations or behaviors of the other vehicles predicted based on the locations and the behaviors of the other vehicles. With this, it is possible to select other vehicles, which are not traveling in the same lane as that of the merging destination vehicle 2c at the current clock time but are expected to be traveling in the same lane as that of the merging destination vehicle 2c in the near future a few seconds later, as the following-candidate vehicles.

Based on the traveling state of the merging destination vehicle 2c and the traveling states of the other vehicles traveling in front of the merging destination vehicle 2c in the lane direction, the following-target vehicle identification unit 43 identifies the following-target vehicle. Consequently, it is possible to properly identify the following-target vehicle out of the following-candidate vehicles.

The following-target vehicle identification unit 43 identifies the other vehicle of the smallest speed difference from the merging destination vehicle 2c out of the following-candidate vehicles as the following-target vehicle. Usually, the driver of the merging destination vehicle 2c drives the merging destination vehicle 2c such that the vehicle speed difference from the following-target vehicle becomes close to zero in order to avoid the collision with the following-target vehicle. Consequently, it is possible to properly identify the following-target vehicle.

The following-target vehicle identification unit 43 identifies the following-target vehicle based on the temporal change in the speed difference between the following-candidate vehicles and the merging destination vehicle 2c. With the temporal change in the speed difference (speed profile) taken into consideration, it is possible to identify the following-candidate vehicle that has the vehicle speed difference which occurs at the current clock time but is to be close to zero in the near future a few seconds later as the following-target vehicle. When not only the host vehicle 1 but also the other vehicle 2d attempts to merge in front of the merging destination vehicle 2c, it is possible to properly identify the following target of the merging destination vehicle 2c.

When there are multiple following-candidate vehicles of the speed difference from the merging destination vehicle 2c equal to or smaller than the predetermined value, the following-target vehicle identification unit 43 identifies the following-candidate vehicle of the shortest distance from the merging destination vehicle 2c in the lane direction out of those following-candidate vehicles as the following-target vehicle. Usually, the driver of the merging destination vehicle 2c is likely to pay attention to the closest other vehicle on the traveling route of the merging destination vehicle 2c. Thus, it is possible to properly identify the following target of the merging destination vehicle 2c even when there are multiple following-candidate vehicles.

The predetermined initial condition is that the other vehicle 2d (first preceding vehicle) traveling in front of the host vehicle 1 starts merging into the adjacent lane L2 or that the host vehicle 1 starts expressing the intention to merge into the adjacent lane L2. The degree of following calculation unit 44 can start the computation of the degree of following by using the external input as a trigger. In this case, the external input is the start of the merging of the other vehicle 2d (first preceding vehicle) into the adjacent lane or the expression of the intention of the lane change by the host vehicle 1 (direction indicator). From the perspective of the merging destination vehicle 2c, the external input is a trigger for changing situations. It is possible to properly determine whether the merging destination vehicle 2c allows the merging of the host vehicle 1 by comparing the initial degree of following when the predetermined initial condition is satisfied and the degree of following at the current clock time with each other.

When the other vehicle 2d (first preceding vehicle) starts merging into the adjacent lane L2 and also the host vehicle 1 starts expressing the intention to merge into the adjacent lane L2 within the predetermined time, the degree of following calculation unit 44 calculates the initial degree of following when the other vehicle 2d (first preceding vehicle) starts merging into the adjacent lane L2. When both the lane change by the other vehicle 2d in front of the merging destination vehicle 2c and the expression of the intention of the lane change by the host vehicle 1 are provided as the external input, it is possible to compute the initial degree of following with the lane change by the other vehicle 2d in front of the merging destination vehicle 2c set as a starting point. From the perspective of the merging destination vehicle 2c, it is likely to set high priority on the merging of the other vehicle 2d in front of the merging destination vehicle 2c in order to assure the safety. It is possible to compute the initial degree of following at a proper timing with this tendency taken into consideration.

The degree of following the following-target vehicle by the merging destination vehicle 2c is calculated based on the location and the traveling state of the following-target vehicle and the location and the traveling state of the merging destination vehicle 2c. It is possible to properly calculate the degree of following the following-target vehicle by the merging destination vehicle 2c by taking into consideration the location and the traveling state of each vehicle.

The degree of following the following-target vehicle by the merging destination vehicle 2c is calculated based on at least either the inter-vehicle distance or the time headway between the following-target vehicle and the merging destination vehicle 2c. It is possible to properly calculate the degree of following the following-target vehicle by the merging destination vehicle 2c by taking into consideration the inter-vehicle distance or the time headway between the following-target vehicle and the merging destination vehicle 2c. From the perspective of the merging destination vehicle 2c, the merging destination vehicle 2c is controlled to maintain either the inter-vehicle distance or the time headway. Thus, it is possible to properly determine whether the merging of the host vehicle 1 is allowed by calculating the degree of following by using either the inter-vehicle distance or the time headway.

The intention estimation unit 45 compares the initial degree of following and the current degree of following with each other to determine whether the inter-vehicle distance or the time headway required for the merging of the host vehicle 1 is added between the following-target vehicle and the merging destination vehicle 2c. Based on the result of the determination, the intention estimation unit 45 determines whether the merging destination vehicle 2c allows the merging of the host vehicle 1. The increased amounts of the inter-vehicle distance Dcd and the time headway Tcd from the time (t1) when the initial condition is satisfied are obtained based on the temporal change in the degree of following. When the increased amounts are comparable to the inter-vehicle distance or the time headway for the merging of the host vehicle 1, it is possible to determine that the other vehicle 2c allows the merging of the host vehicle 1. Thus, it is possible to make the proper merging determination of the host vehicle 1 by taking into consideration the temporal change in the degree of following.

Note that, the above-described embodiments are examples of the present invention.

Therefore, it is needless to say that the present invention is not limited to the above-described embodiments, and even for a mode other than the embodiments, various changes can be made depending on the design without departing from the technical idea according to the present invention.

REFERENCE SIGNS LIST 1 host vehicle
2a to 2f other vehicle
2c merging destination vehicle, second other vehicle
2d first other vehicle, following-target vehicle
Dce, Dcd inter-vehicle distance
Tce, Tcd time headway
L1 host lane
L2 adjacent lane
Pmer mergeable section

The invention claimed is:

1. A travel assistance method, for a case where a host lane in which a host vehicle is traveling merges into an adjacent lane in front of the host vehicle, that assists the merging of the host vehicle into the adjacent lane, comprising:
   obtaining data indicating lane structures of the host lane and the adjacent lane;
   detecting locations of a plurality of other vehicles traveling in the host lane or the adjacent lane in a mergeable section in which the merging into the adjacent lane from the host lane is possible based on the lane structures;
   based on a location relationship between a first preceding vehicle traveling in front of the host vehicle on the host lane and the other vehicles traveling in the adjacent lane, determining whether the other vehicles traveling in the adjacent lane allowed the merging of the first preceding vehicle; and
   based on a result of the determination, selecting a merging destination vehicle out of the other vehicles that will travel in front of or behind the host vehicle when the host vehicle merges into the adjacent lane.

2. The travel assistance method according to claim 1, wherein
   whether the other vehicles traveling in the adjacent lane allowed the merging of the first preceding vehicle is determined based on actions concerning merging among the other vehicles.

3. The travel assistance method according to claim 1, wherein
   a pair of a first other vehicle and a second other vehicle to which the first other vehicle gave way during merging is generated as the result of the determination.

4. The travel assistance method according to claim 1, wherein
   the number of times of giving way by a first other vehicle that gave way to a second other vehicle during merging is counted as the result of the determination.

5. The travel assistance method according to claim 1, wherein
   deceleration for giving way by a first other vehicle that gave way to a second other vehicle during merging is stored as the result of the determination.

6. The travel assistance method according to claim 1, wherein
   a fact that the other vehicles rejected a merging request is stored as the result of the determination.

7. The travel assistance method according to claim 1, wherein
   for each of the other vehicles, a first merging failure expectation which is an expectation that the host vehicle will fail in merging in front of or behind the other vehicle, is calculated based on the result of the determination,
   for each of the other vehicles traveling in the adjacent lane in the lane direction within the mergeable section, a second merging failure expectation which is an expectation that the host vehicle will fail in merging in front of or behind the other vehicle, is calculated based on locations of the other vehicles,
   a post-integration failure expectation which is an integration of the first merging failure expectation and the second merging failure expectation is calculated, and
   based on the post-integration failure expectation, the merging destination vehicle that will travel in front of or behind the host vehicle when the host vehicle merges into the adjacent lane is selected out of the other vehicles.

8. The travel assistance method according to claim 7, wherein
   the post-integration failure expectation is calculated for each of the other vehicles.

9. The travel assistance method according to claim 7, wherein both the first merging failure expectation and second merging failure expectation are weighted, and the weighted first merging failure expectation and second merging failure expectation are integrated to calculate the post-integration failure expectation.

10. The travel assistance method according to claim 7, wherein a pair of a first other vehicle and a second other vehicle to which the first other vehicle gave way during merging is generated as the result of the determination, and for each of the first and second other vehicles in the generated pair, the higher first merging failure expectation than those of the other vehicles not included in the generated pair is calculated.

11. The travel assistance method according to claim 7, wherein the number of times of giving way by a first other vehicle that gave way to a second other vehicle during merging is counted as the result of the determination, and for the first other vehicle, the higher first merging failure expectation is calculated as the number of times of giving way is greater.

12. The travel assistance method according to claim 7, wherein deceleration for giving way by a first other vehicle that gave way to a second other vehicle during merging is stored as the result of the determination, and for the first other vehicle, the higher first merging failure expectation is calculated as the deceleration for giving way is greater.

13. The travel assistance method according to claim 7, wherein a pair of a first other vehicle and a second other vehicle to which the first other vehicle gave way during merging is generated as the result of the determination, and for the second other vehicle, the lower first merging failure expectation than that of the first other vehicle is calculated when a predetermined allowance condition is satisfied.

14. The travel assistance method according to claim 13, wherein the predetermined allowance condition is that an inter-vehicle distance between the second other vehicle and a second preceding vehicle traveling in front of the second other vehicle is equal to or greater than a predetermined value.

15. The travel assistance method according to claim 7 wherein a fact that the other vehicles rejected a merging request is stored as the result of the determination, and for each of the other vehicles that rejected the merging request, the higher first merging failure expectation than that of a first other vehicle that gave way to a second other vehicle during merging is calculated.

16. The travel assistance method according to claim 7, wherein the second merging failure expectation is calculated based on the lane structures and a change in behavior of the host vehicle.

17. The travel assistance method according to claim 16, wherein the higher second merging failure expectation is calculated as acceleration or deceleration of the host vehicle is greater.

18. The travel assistance method according to claim 7, wherein the other vehicle of the lowest post-integration failure expectation is selected as the merging destination vehicle.

19. The travel assistance method according to claim 1, wherein a following-target vehicle, which is a target followed by the merging destination vehicle, is identified out of other vehicles traveling in either of the host lane, the adjacent lane, and a lane adjacent to the adjacent lane, an initial degree of following, which is a degree of following the following-target vehicle by the merging destination vehicle when a predetermined initial condition is satisfied, is calculated, a current degree of following, which is a degree of following after a predetermined time from the calculation of the initial degree of following, is calculated, a difference between the initial degree of following and the current degree of following is calculated, and based on the difference, whether the merging destination vehicle allows the merging of the host vehicle is determined.

20. The travel assistance method according to claim 19, wherein the following-target vehicle is identified based on the lane structures and traveling states of the other vehicles.

21. The travel assistance method according to claim 20, wherein the traveling states of the other vehicles are locations and behaviors of the other vehicles.

22. The travel assistance method according to claim 20 or 21, wherein the traveling states of the other vehicles are at least either of future locations or behaviors of the other vehicles predicted based on the locations and the behaviors of the other vehicles.

23. The travel assistance method according to claim 19, wherein the following-target vehicle is identified based on a traveling state of the merging destination vehicle and traveling states of the other vehicles traveling in front of the merging destination vehicle in the lane direction.

24. The travel assistance method according to claim 23, wherein the other vehicle of the smallest speed difference from the merging destination vehicle out of the other vehicles traveling in front of the merging destination vehicle in the lane direction is identified as the following-target vehicle.

25. The travel assistance method according to claim 23, wherein the following-target vehicle is identified based on a temporal change in the speed difference between the merging destination vehicle and each of the other vehicles traveling in front of the merging destination vehicle in the lane direction.

26. The travel assistance method according to claim 23, wherein when there are a plurality of other vehicles of the speed difference from the merging destination vehicle equal to or smaller than a predetermined value out of the other vehicles traveling in front of the merging destination vehicle in the lane direction, the other vehicle of the shortest distance from the merging destination vehicle in the lane direction out of the other vehicles of the speed difference from the merging destination vehicle equal to or smaller than the predetermined value is identified as the following-target vehicle.

27. The travel assistance method according to claim 19, wherein the predetermined initial condition is that the first preceding vehicle traveling in front of the host vehicle starts merging into the adjacent lane or that the host vehicle starts expressing an intention to merge into the adjacent lane.

28. The travel assistance method according to claim 27, wherein in a case where the first preceding vehicle starts merging into the adjacent lane and where the host vehicle starts expressing the intention to merge into the adjacent lane within a predetermined time, the initial degree of following is calculated when the first preceding vehicle starts merging into the adjacent lane.

29. The travel assistance method according to claim 19, wherein the initial degree of following and the current degree of following the following-target vehicle by the merging destination vehicle are calculated respectively based on a location and a traveling state of the following-target vehicle and a location and the traveling state of the merging destination vehicle.

30. The travel assistance method according to claim 19, wherein the initial degree of following and the current degree of following the following-target vehicle by the merging destination vehicle are calculated based on at least one of an inter-vehicle distance or a time headway between the following-target vehicle and the merging destination vehicle.

31. The travel assistance method according to claim 19, wherein the initial degree of following and the current degree of following are compared with each other to determine whether the inter-vehicle distance required for the merging of the host vehicle is added between the following-target vehicle and the merging destination vehicle, and based on the result of the determination, whether the merging destination vehicle allows the merging of the host vehicle is determined.

32. The travel assistance method according to claim 19, wherein the initial degree of following and the current degree of following are compared with each other to determine whether the time headway required for the merging of the host vehicle is added between the following-target vehicle and the merging destination vehicle, and based on the result of the determination, whether the merging destination vehicle allows the merging of the host vehicle is determined.

33. A travel assistance device that, in a case where a host lane in which a host vehicle is traveling merges into an adjacent lane in front of the host vehicle, uses a computer including a controller and a memory to assist the merging of the host vehicle into the adjacent lane, wherein the memory stores data indicating lane structures of the host lane and the adjacent lane, and the controller detects locations of a plurality of other vehicles traveling in the host lane or the adjacent lane in a mergeable section in which the merging into the adjacent lane from the host lane is possible based on the lane structures, determines whether the other vehicles traveling in the adjacent lane allowed the merging of the first preceding vehicle, based on locations of a first preceding vehicle traveling in front of the host vehicle on the host lane and the other vehicles traveling in the adjacent lane; and selects a merging destination vehicle that will travel in front of or behind the host vehicle when the host vehicle merges into the adjacent lane out of the other vehicles, based on a result of the determination.

\* \* \* \* \*